(12) United States Patent
Nguyen Thi Thanh et al.

(10) Patent No.: US 10,023,756 B2
(45) Date of Patent: Jul. 17, 2018

(54) SOLID DRAWING MATERIAL

(71) Applicant: Mitsubishi Pencil Company, Limited, Tokyo (JP)

(72) Inventors: Huyen Nguyen Thi Thanh, Fujioka (JP); Tatsuya Murata, Fujioka (JP); Motohiro Kasai, Fujioka (JP); Katsunori Kitazawa, Fujioka (JP); Masaaki Matsumoto, Fujioka (JP); Kiyoshi Fujisawa, Fujioka (JP); Kiyohiko Kobayashi, Fujioka (JP); Yumi Morooka, Fujioka (JP)

(73) Assignee: MITSUBISHI PENCIL COMPANY, LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/307,629

(22) PCT Filed: Apr. 22, 2015

(86) PCT No.: PCT/JP2015/062258
§ 371 (c)(1),
(2) Date: Oct. 28, 2016

(87) PCT Pub. No.: WO2015/166859
PCT Pub. Date: Nov. 5, 2015

(65) Prior Publication Data
US 2017/0051173 A1    Feb. 23, 2017

(30) Foreign Application Priority Data

Apr. 28, 2014 (JP) ................. 2014-092440
Apr. 28, 2014 (JP) ................. 2014-092441
Apr. 28, 2014 (JP) ................. 2014-092442
Apr. 28, 2014 (JP) ................. 2014-092443

(51) Int. Cl.
C09D 13/00    (2006.01)

(52) U.S. Cl.
CPC .................... C09D 13/00 (2013.01)

(58) Field of Classification Search
CPC ...................................................... C09D 13/00
USPC ..................... 106/31.07, 31.1, 31.12
See application file for complete search history.

(56) References Cited

U.S. PATENT DOCUMENTS

| | | | |
|---|---|---|---|
| 3,491,043 A | 1/1970 | Zmitrovis | |
| 4,212,676 A * | 7/1980 | Ueda .................. | C09D 13/00 106/31.1 |
| 5,261,952 A | 11/1993 | Craig | |
| 9,090,784 B2 * | 7/2015 | Kitazawa ............. | C09D 13/00 |
| 2004/0016366 A1 | 1/2004 | Hashimoto et al. | |
| 2005/0252409 A1* | 11/2005 | Nakamura ........... | C09D 13/00 106/31.07 |
| 2009/0209678 A1 | 8/2009 | Sumitomo et al. | |
| 2013/0177345 A1 | 7/2013 | Kitazawa et al. | |

FOREIGN PATENT DOCUMENTS

| | | |
|---|---|---|
| DE | 4229555 A1 | 3/1994 |
| EP | 2602292 A1 | 6/2013 |
| JP | 65-048268 A | 4/1980 |
| JP | S 62-682873 A | 3/1987 |
| JP | H 3-153778 A | 7/1991 |
| JP | H 3-221574 A | 9/1991 |
| JP | H04-225082 A | 8/1992 |
| JP | H06-184488 A | 7/1994 |
| JP | H 6-313146 A | 11/1994 |
| JP | 2001-200188 A | 7/2001 |
| JP | 2002-201399 A | 7/2002 |
| JP | 2002-332445 A | 11/2002 |
| JP | 2004-352734 A | 12/2004 |
| JP | 2006-89616 A | 4/2006 |
| JP | 2006-206734 A | 8/2006 |
| JP | 2007-119516 A | 5/2007 |
| JP | 2008-19326 A | 1/2008 |
| JP | 2008-31372 A | 2/2008 |
| JP | 2008-045043 A | 2/2008 |
| JP | 2009-132822 A | 6/2009 |
| JP | 2010-126705 A | 6/2010 |
| JP | 2011-116800 A | 6/2011 |
| JP | 2012-12463 A | 1/2012 |

(Continued)

OTHER PUBLICATIONS

English translation of JP 2011/116800, Jun. 2011; 8 pages.*
English translation of JP 2015/214633, May 2014; 12 pages.*
PCT International Preliminary Report on Patentability (IPRP) and Written Opinion dated Nov. 10, 2016, in corresponding International Application No. PCT/JP2015/062258 ( 6 pages).
International Search Report (PCT/ISA/210) dated Jul. 1, 2015, by the Japanese Patent Office as the International Searching Authority for International Application No. .PCT/JP2015/062258.
Written Opinion (PCT/ISA/237) dated Jul. 1, 2015, by the Japanese Patent Office as the International Searching Authority for International Application No. PCT/JP2015/062258.

(Continued)

*Primary Examiner* — Helene Klemanski
(74) *Attorney, Agent, or Firm* — Buchanan, Ingersoll & Rooney PC

(57) ABSTRACT

Provided is a solid drawing material containing at least a resin, waxes, a pigment and an extender, wherein it further contains at least one selected from dibasic acids having 12 to 30 carbon atoms and derivatives thereof, and the resin is at least one selected from rosin and modified products thereof, terpene resins and modified products thereof, petroleum resins, maleic acid resins and derivatives thereof, coumarone.indene resins and derivatives thereof, and isoprene base resins. The solid drawing material can draw smoothly, darkly and finely pictures not only on smooth and non-absorbing surfaces of art paper, coated paper, milk packs, plastics such as PET, metal, glass, white boards, and the like, but also on eyebrows, lips, skins and the like as well as ordinary papers such as wood free paper, drawing paper and copier paper and which can readily be erased from the non-absorbing surfaces.

6 Claims, No Drawings

(56) References Cited

FOREIGN PATENT DOCUMENTS

| | | | |
|---|---|---|---|
| JP | 2012-52109 A | | 3/2012 |
| JP | 2015/214663 A | * | 12/2015 |
| WO | 95/04785 A1 | | 2/1995 |
| WO | WO 01/98417 A1 | | 12/2001 |
| WO | WO 2012/018107 A1 | | 2/2012 |

OTHER PUBLICATIONS

Extended Search Report issued by the European Patent Office in corresponding European Patent Application No. 15785637.8-1302 dated Dec. 15, 2017 (4 pages).

* cited by examiner

SOLID DRAWING MATERIAL

TECHNICAL FIELD

The present invention relates principally to a wood case color pencil prepared by loading a lead in a wood case, a pencil or a crayon prepared by winding a lead by paper or a sheet capable of being sharpened by a pencil sharpener, a pencil or a crayon prepared by loading a lead in an outer holder capable of being sharpened by a pencil sharpener, or a solid drawing material composed simply of only a lead, and relates to a water-soluble solid drawing material which provides drawn surfaces similar to watercolor paintings by tracing the drawn surfaces with a brush soaked with water after drawing pictures, and a solid drawing material suited principally to a non-calcined color pencil lead or a calcined color pencil lead for a wood case color pencil lead, a color pencil lead for a mechanical pencil and the like.

BACKGROUND ART

Conventional solid drawing materials are obtained by adding, if necessary, an oil such as mineral oil, a resin and the like to a compound comprising at least a wax, a pigment and an extender to adjust a hardness thereof.

Known are, for example, 1) a solid drawing material comprising at least a pigment, a resin for molding, a wax, an extender, and 0.1 to 20% by weight of a terpene resin and/or a terpene resin derivative based on the total amount of the drawing material (refer to, for example, patent document 1), 2) a solid drawing material comprising at least a pigment, an olefin base resin, a wax, a fatty acid amide, and at least one resin selected from the rosin, an ester gum, a coumarone resin and an alkyd resin (refer to, for example, patent document 2), 3) a fluorescent drawing material comprising a fluorescent pigment, waxes, a fatty acid which is a solid at room temperature and adhesive resin having a Gardner value of 4 or less (refer to, for example, patent document 3), 4) a solid drawing material containing at least a colorant, polybutene and a mixture comprising at least one selected from an ethylene-propylene-butene copolymer, amorphous polypropylene, an ethylene-polar monomer copolymer, polyethylene, polyisobutylene, and amorphous poly-α-olefin (refer to, for example, patent document 4), and 5) a solid drawing material comprising at least a colorant, a molding agent and an oil material, wherein a middle chain fatty acid is used as the oil material (refer to, for example, patent document 5).

However, the solid drawing materials described in the patent documents 1 to 5 are reduced in strength and liable to be broken when an amount of oil which is liquid is increased for softening, and therefore it is impossible to mold them into fine leads or shave the tips of the leads to sharpen them, which makes it difficult to draw fine pictures. Also, when drawing pictures on smooth and non-absorbing surfaces of art paper, coated paper, milk packs, plastics such as PET, metal, glass, white boards, and the like, a problem is involved therein in terms of that the leads slip on the surfaces thereof to make it impossible to draw dark pictures thereon in spite of the soft leads.

On the other hand, if the drawing materials are increased in an amount of the resins in order to enhance strength of the leads, the drawing materials can be molded into fine leads, but the leads are hard and therefore involve a problem in terms of that the leads cannot be used for drawing pictures on smooth and non-absorbing surfaces of art paper, coated paper, milk packs, plastics such as PET, metal, glass, white boards, and the like.

Meanwhile, recently known is a solid drawing material which is prepared by mixing a specific resin component, an organic solvent, a gelling agent and a colorant and which is improved in a coloring property on a smooth surface (refer to, for example, patent document 6), but since it contains liquid, it is still unsatisfactory in terms of strength. The drawing material cannot be molded into a fine lead, and the tip of the lead cannot be shaved and sharpened. Also, when the organic solvent having a low boiling point is used, an outer holder for preventing volatilization is required to provide a problem in terms of inferior convenience in use.

Further, the present applicants provide a solid drawing material containing a specific resin component, a wax component, a pigment, titanium dioxide and an extender, wherein the specific resin component and the wax component are mixed in a specific ratio to solve the problem described above (refer to, for example, patent document 7), but a content of the low-melting point blending component or the liquid oil is restricted to some extent in order to maintain the practical strength, and when further dark drawn lines are required, their intensity is limited. Accordingly, the drawing material concerned is desired strongly to be further improved.

Also, various inventions have so far been published as conventional water-soluble solid drawing materials, and they are actually put on the market as the products.

Known as representatives thereof are water-soluble solid drawing materials in which in the blending components of a conventional non-aqueous solid drawing material comprising a non-aqueous wax, a resin, a pigment and an extender, a surfactant or polyethylene glycol replaced the non-aqueous wax described above is used, if necessary, as a wax and in which the resin is replaced with a water-soluble resin (refer to, for example, patent documents 8 and 9).

Further, known as the water-soluble solid drawing material are, for example 1) a water-soluble solid drawing material comprising at least a colorant and a surfactant, wherein two or more kinds of surfactants having a melting point of lower than 55° C. and surfactants having a melting point of 55° C. or higher are used in combination of each one or more kinds out of both the surfactants (refer to, for example, patent document 10), 2) a water-soluble solid drawing material containing at least a pigment, a wax, a surfactant which is solid at room temperature, and phytosterol (refer to, for example, patent document 11), and 3) a water-soluble solid drawing material comprising at least a colorant, sulfonic acid-modified polyvinyl acetate and a fatty acid metal salt (refer to, for example, patent document 12).

However, when drawing pictures on smooth surfaces, the above water-soluble solid drawing materials slip on the surfaces to make it less liable to be abraded thereon, and therefore when drawing pictures on art paper, coated paper, milk packs, plastics such as PET, metal, glass, white boards, and the like, a problem is involved in terms of that the drawing materials cannot draw pictures or can only draw them unsatisfactorily.

Further, products called water-soluble crayon are put as well on the market, and all of them are softened by low-melting point substances or oils which are liquid at room-temperature. Accordingly, when drawing pictures on smooth and non-absorbing surfaces of art paper, coated paper, milk packs, plastics such as PET, metal, glass, white boards, and the like, a problem is involved therein in terms of that the crayons slip on the surfaces to make dark lines impossible to be drawn and that solubility of the crayon on a drawing surface is unsatisfactory because of water repellency of the oil.

On the other hand, conventional solid drawing materials for non-calcined color pencil leads are produced by a method in which a compound comprising a binder such as a resin, waxes, a pigment and an extender is kneaded, extrusion molded and in which the molded product is then blended, if necessary, with water, an organic solvent and the like and dried.

The non-calcined color pencil leads are desired to draw pictures more darkly in order to enhance a quality thereof, but if the leads are softened by increasing a content of the low-melting wax so that the leads are increased in abrasion on paper surfaces of drawing paper and canvases for oil paintings, the problem that the leads are liable to be broken is caused.

Also, when drawing pictures on smooth and non-absorbing surfaces of art paper, coated paper, milk packs, plastics such as PET, metal, glass, white boards, and the like, a problem is involved therein as well in terms of that the leads slip on the surfaces to make it scarcely possible to draw pictures thereon.

In conventional solid drawing materials for non-calcined color pencil leads, known are, for example 1) a non-calcined color pencil lead prepared by blending at least a binder, a colorant and an extender and molding the mixture, wherein a specific secondary amide type long chain acylamino acid and/or a salt thereof and lithium soap are used in combination (refer to, for example, patent document 13), 2) a non-calcined color pencil lead containing a colorant, a binder, an extender, a wax and/or oils & fats, and a hydrophilic surfactant, wherein a polyoxyethylene adduct of oils & fats is contained as the hydrophilic surfactant described above (refer to, for example, patent document 14), and 3) a non-calcined color pencil lead containing at least a water-soluble resin, a colorant and an extender, wherein a mixture of glycerin fatty acid ester and/or pentaerythritol fatty acid ester, each having a melting point of 65° C. or lower and rosin and/or a rosin-modified product is contained as waxes (refer to, for example, patent document 15).

However, in the non-calcined color pencil leads described in the patent documents 14 and 15, a problem is still involved therein in terms of sufficiently high strength and color developability, and when drawing pictures on smooth and non-absorbing surfaces of art paper, coated paper, milk packs, plastics such as PET, metal, glass, white boards, and the like, a problem is involved therein as well in terms of that the leads slip on the surfaces to make it scarcely possible to draw pictures thereon.

Also, the non-calcined color pencil lead disclosed in the patent document 15 described above has not so far been available, and it is strongly desired to be further improved in a drawing performance when drawing pictures on smooth and non-absorbing surfaces of metal, glass, white boards and the like.

On the other hand, conventional solid drawing materials for calcined color pencil leads are produced, in a case of a black lead, by a method in which a compound comprising a binder such as clay, a natural polymer, a synthetic polymer, pitch and asphalt, powder such as natural crystalline graphite, natural amorphous graphite, artificial graphite, carbon black and boron nitride, and, if necessary, a plasticizer, a solvent and the like is kneaded, extrusion molded, in which the molded product is then dried up, if necessary, to remove the solvent and the like, in which it is heated at a high temperature of 800° C. or higher in a non-oxidative atmosphere and in which it is further impregnated with a fat & oil such as whale oil, lard, spindle oil, liquid paraffin, an α-olefin oligomer and dimethyl silicone oil, a wax and the like.

Also, in a case of calcined color leads, they are produced by a method in which a compound comprising a binder such as clay, a natural polymer, a synthetic polymer, pitch and asphalt, boron nitride, if necessary, powder such as natural crystalline graphite, natural amorphous graphite, artificial graphite and carbon black, and additives such as a plasticizer and a solvent is kneaded, extrusion molded, in which the molded product is then heated, if necessary, to remove the solvent and the like, in which it is heated at a high temperature of 800° C. or higher in a non-oxidative atmosphere, in which it is further heated at 800° C. or lower in an ambient atmosphere, in which it is then dipped in a solution of polymetalloxane such as perhydropolysilazane, polysiloxane, polyaluminoxane and polyzirconoxane, a silicon chelate, an aluminum chelate, a zirconium chelate, and the like, and heated subsequently at a high temperature of 700° C. or higher in a non-oxidative atmosphere and in which it is then impregnated with a non-volatile dye ink and the like, and a method in which a compound comprising clay, boron nitride, if necessary, powder such as natural crystalline graphite, natural amorphous graphite, artificial graphite and carbon black, and additives such as a solvent is kneaded with water and the like, extrusion molded, in which the molded product is then heated, if necessary, to remove water, in which it is heated at a high temperature of 800° C. or higher in a non-oxidative atmosphere and in which it is further impregnated with a non-volatile dye ink and the like.

Further, in recent years, known as drawing materials providing calcined color pencil leads having a smooth writing performance and an effect of enhancing intensity are, for example, 1) a calcined pencil lead in which pores are impregnated with at least a fluorine base oil (refer to, for example, patent document 16), 2) a calcined pencil lead in which pores provided in a calcined lead body are impregnated with at least a specific polyethylene glycol monostearate and/or a specific polyethylene glycol distearate (refer to, for example, patent document 17), and 3) a calcined pencil lead in which pores provided in a calcined lead body are impregnated with an ink comprising at least polyethylene glycol and 12-hydroxystearic acid (refer to, for example, patent document 18).

However, the conventional calcined pencil leads described in the patent documents 16 to 18 have been improved so that both the black leads and the color leads can draw dark lines on ordinary wood free paper, copier paper and the like, but when drawing pictures on smooth and non-absorbing surfaces of art paper, coated paper, plastics, metal, glass, white boards, and the like, a problem is involved therein in terms of that the leads slip on the surfaces to make it scarcely possible to draw pictures thereon, and even when drawing pictures on paper of a notebook, a memo pad and the like having a slightly high smoothness, a problem is involved therein in terms of that the leads slip on the surfaces to provide only light drawn lines.

PRIOR ART DOCUMENTS

Patent Documents

Patent document 1: Japanese Patent Application Laid-open No. Sho 62-62873 (claims, examples and others)
Patent document 2: Japanese Patent Application Laid-open No. Hei 3-221574 (claims, examples and others)

Patent document 3: Japanese Patent Application Laid-open No. Hei 6-313146 (claims, examples and others)
Patent document 4: Japanese Patent Application Laid-open No. 2006-206734 (claims, examples and others)
Patent document 5: Japanese Patent Application Laid-open No. 2007-119516 (claims, examples and others)
Patent document 6: Japanese Patent Application Laid-open No. 2008-119326 (claims, examples and others)
Patent document 7: Japanese Patent Application Laid-open No. 2012-52109 (claims, examples and others)
Patent document 8: Japanese Patent Application Laid-open No. Hei 3-153778 (claims, examples and others)
Patent document 9: Japanese Patent Application Laid-open No. 2002-201399 (claims, examples and others)
Patent document 10: Japanese Patent Application Laid-open No. 2004-352734 (claims, examples and others)
Patent document 11: Japanese Patent Application Laid-open No. 2009-132822 (claims, examples and others)
Patent document 12: Japanese Patent Application Laid-open No. 2010-126705 (claims, examples and others)
Patent document 13: Japanese Patent Application Laid-open No. 2001-200188 (claims, examples and others)
Patent document 14: Japanese Patent Application Laid-open No. 2002-332445 (claims, examples and others)
Patent document 15: Japanese Patent Application Laid-open No. 2008-45043 (claims, examples and others)
Patent document 16: Japanese Patent Application Laid-open No. 2006-89616 (claims, examples and others)
Patent document 17: Japanese Patent Application Laid-open No. 2008-31372 (claims, examples and others)
Patent document 18: Japanese Patent Application Laid-open No. 2012-12463 (claims, examples and others)

OUTLINE OF THE INVENTION

Problems to be Solved by the Invention

In light of the problems on the solid drawing materials of the conventional arts described above, and the like, the present invention intends to solve them, and an object thereof is to provide a solid drawing material which has sufficiently high strength and a smooth writing performance and particularly can draw remarkably dark pictures even on smooth and non-absorbing surfaces of art paper, coated paper, milk packs, plastics such as PET, metal, glass, white boards, and the like, to be more specific, which can draw darkly, finely and detailedly pictures on eyebrows, lips, skins and the like as well as transparent plate surfaces of transparent plastics, glass and the like and which can be readily erased by cloths, papers such as tissue paper, white board erasers when drawn on the non-absorbing surfaces described above.

Also, in light of the problems on the water-soluble solid drawing materials of the conventional arts described above, and the like, the present invention intends to solve them, and an object thereof is to provide a solid drawing material which has sufficiently high strength and a smooth writing performance and particularly can draw remarkably dark pictures even on smooth and non-absorbing surfaces of art paper, coated paper, milk packs, plastics such as PET, metal, glass, white boards, and the like and which is dissolved readily and evenly on drawn surfaces by tracing the drawn surfaces with a brush soaked with water after drawing pictures to provide the drawn surfaces similar to watercolor paints.

Further, in light of the problems on the non-calcined color pencil leads of the conventional arts described above, the present invention intends to solve them, and an object thereof is to provide a solid drawing material suited to a non-calcined color pencil lead which has sufficiently high strength and a smooth writing performance and can draw remarkably dark pictures even on smooth and non-absorbing surfaces of art paper, coated paper, milk packs, plastics such as PET, metal, glass, white boards, and the like as well as ordinary painting paper such as drawing paper and canvases for oil paintings.

Furthermore, in light of the problems on the calcined pencil leads of the conventional arts described above, the present invention tries to solve them, and an object thereof is to provide a calcined pencil lead which can draw remarkably dark pictures even on smooth and non-absorbing surfaces of art paper, coated paper, plastics, metal, glass, white boards, and the like as well as paper of a notebook, a memo pad and the like having high smoothness. Further, an object thereof is to provide a solid drawing material suited to a water-soluble calcined pencil lead which is dissolved readily and evenly on written surfaces by tracing the written surfaces with a brush soaked with water after writing.

Means for Solving the Problems

Intense researches repeated by the present inventors in order to solve the problems on the solid drawing materials of the conventional arts described above have resulted in finding that a solid drawing material which meets the object described above is obtained by a solid drawing material comprising at least a resin, waxes, a pigment and an extender, wherein it further contains a specific dibasic acid and a derivative thereof. Thus, the solid drawing material of the present invention has come to be completed.

That is, the present invention comprises the following items (1) to (7).

(1) A solid drawing material containing at least a resin, waxes, a pigment and an extender, wherein it further contains at least one selected from dibasic acids having 12 to 30 carbon atoms and derivatives thereof, and the resin is at least one selected from rosin and modified products thereof, terpene resins and modified products thereof, petroleum resins, maleic acid resins and derivatives thereof, coumarone.indene resins and derivatives thereof, and isoprene base resins.

(2) The solid drawing material as described in the above item (1), wherein the dibasic acid having 12 to 30 carbon atoms and the derivative thereof are a dibasic acid and a derivative thereof represented by the following formula (1):

$$R_2OOC-R_1-COOR_3 \qquad (1)$$

wherein $R_1$ is a linear or branched alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

(3) The solid drawing material as described in the above item (1), wherein the dibasic acid having 12 to 30 carbon atoms and the derivative thereof are a long-chain dibasic acid diglycidyl ester having 12 to 30 carbon atoms.

(4) The solid drawing material as described in any one of the above items (1) to (3), wherein the dibasic acid having 12 to 30 carbon atoms and the derivative thereof have a melting point of 70° C. or lower.

(5) The solid drawing material as described in any one of the above items (1) to (4), wherein a content of the dibasic acid having 12 to 30 carbon atoms and the derivative thereof falls in a range of 1 to 12% by mass based on the total amount of the solid drawing material.
(6) The solid drawing material as described in any one of the above items (1) to (5), wherein a mass ratio (A):(B) of at least one (A) selected from the dibasic acids having 12 to 30 carbon atoms and the derivatives thereof to the whole waxes (B) contained in the solid drawing material falls in a range of 2:100 to 20:100.
(7) The solid drawing material as described in any one of the above items (1) to (6), wherein a content of titanium dioxide as the pigment falls in a range of 5% by mass or more based on the total amount of the solid drawing material.

Effects of the Invention

According to the present invention, provided is a solid drawing material which has a smooth writing performance and particularly can draw darkly, finely and detailedly pictures not only on smooth and non-absorbing surfaces of art paper, coated paper, milk packs, plastics such as PET, metal, glass, white boards, and the like, but also eyebrows, lips, skins and the like and which can readily be erased by cloths, papers such as tissue paper, white board erasers, and the like when drawn on the non-absorbing surfaces described above.

MODE FOR CARRYING OUT THE INVENTION

The embodiments of the present invention shall be explained below in detail.
The solid drawing material of the present invention comprises:
a solid drawing material in which pictures drawn on non-absorbing surfaces can be readily erased by cloths, papers such as tissue paper, white board erasers (first embodiment), a water-soluble solid drawing material which provides drawn surfaces similar to watercolor paintings by drawing pictures and then tracing the pictures drawn on the surfaces with a brush soaked with water (second embodiment), and a solid drawing material suited principally to a non-calcined color pencil lead or a calcined color pencil lead for wood case color pencil lead, a color pencil lead for a mechanical pencil, and the like (third embodiment, fourth embodiment).

Solid Drawing Material: First Embodiment

The solid drawing material which is the first embodiment of the present invention contains at least a resin, waxes, a pigment and an extender, wherein it further contains at least one selected from dibasic acids having 12 to 30 carbon atoms and derivatives thereof, and the resin is at least one selected from rosin and modified products thereof, terpene resins and modified products thereof, petroleum resins, maleic acid resins and derivatives thereof, coumarone.indene resins and derivatives thereof, and isoprene base resins.

At least one selected from the dibasic acids having 12 to 30 carbon atoms and the derivatives thereof which are used in the present invention is a component which can allow the solid drawing material to draw pictures on a smooth surface and to exert sufficiently high strength, and any ones can be used without specific restrictions as long as they are included in the category of the dibasic acid having 12 to 30 carbon atoms and the derivative thereof.

The dibasic acid having 12 to 30 carbon atoms and the derivative thereof which can be used include, for example, dibasic acid having 12 to 30 carbon atoms and a derivative thereof represented by the following formula (1), and a long-chain dibasic acid diglycidyl ester having 12 to 30 carbon atoms, and the like:

$$R_2OOC-R_1-COOR_3 \quad (1)$$

wherein $R_1$ is an alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

In the formula (1) described above, $R_1$ is a linear or branched alkylene group or alkenylene group having 10 to 28, preferably 14 to 24 carbon atoms. When it has a branched chain, the branched chain is preferably an alkyl group having 1 to 8 carbon atoms (methyl, ethyl and the like), a substituted or unsubstituted aryl group, an epoxy group and a glyceryl group.

The linear or branched alkylene group includes various linear alkylene groups of "—$(CH_2)_{10}$—" to "—$(CH_2)_{28}$—", and in the case of the branched alkylene group, "—CH[(A)]—$(CH_2)_n$—CH[(B)]—" (wherein A and B are same or different alkyl groups, A is represented by $C_mH_{2m+1}$ and B is represented by $C_lH_{2l+1}$ and l+m+n is a number of carbon atoms of 8 to 26), and "—$(CH_2)_x$—CH[(A)]-$(CH_2)_n$—CH[(B)]—$(CH_2)_y$—" (wherein A and B are same or different alkyl groups, A is represented by $C_mH_{2m+1}$ and B is represented by $C_lH_{2l+1}$ and l+m+n+x+y is a number of carbon atoms of 8 to 26). The linear alkenylene group includes "—$(CH_2)_x$—C=C—$(CH_2)_y$—C=C—$(CH_2)_z$—" (wherein x+y+z is a number of carbon atoms of 6 to 24), and in the case of the branched alkenylene group, it includes "—$(CH_2)_x$—C[(A)]=CH—$(CH_2)_y$—CH=C[(B)]—$(CH_2)_z$—" (wherein A and B are same or different alkyl groups, A is represented by $C_mH_{2m+1}$ and B is represented by $C_lH_{2l+1}$ and l+m+x+y+z is a number of carbon atoms of 6 to 24).

In the formula (1), $R_2$ and $R_3$ may be same or different and include a hydrogen atom, an alkyl group having 1 to 8 carbon atoms, an alkali metal such as lithium (Li), sodium (Na) and potassium (K), an amine salt such as an ammonium salt, an alkyl amine salt, a quaternary ammonium salt and an alkanolamine salt, an epoxy group, a phenyl group and a glyceryl group.

The dibasic acids and the derivatives thereof represented by the formula (1) described above are known, and a production method therefor is known as well. The compounds obtained by various production methods can be used, and commercial products can be used as well if available.

The dibasic acid and the derivative thereof represented by the formula (1) which can be used in the present invention include, for example, at least one (each alone or a mixture of two or more kinds thereof) of dodecanedioic acid, octadecanedioic acid, eicosanedioic acid, octacosanedioic acid, dimethyl eicosanedioate, 8-ethyloctadecanedioic acid, 8,13-dimethyleicosanedioic acid, dimethyl 8,12-eicosadienedioate, bis(oxylanylmethyl) 8,13-dimethyl-8,12-eicosadienedioate, japanic acid glyceride, and the like. They are particularly preferably 8-ethyloctadecanedioic acid, dimethyl 8,12-eicosadienedioate and japanic acid glyceride. The japanic acid is dibasic acids (mixture) having 20 (C20) and 22 (C22) carbon atoms, and the japanic acid glyceride is dimolecular type glyceride in which two molecules of glycerin are combined with a dibasic acid in a crosslinking form. A synthetic method thereof is known.

The long-chain dibasic acid diglycidyl ester used in the present invention is a long-chain aliphatic dibasic acid diglycidyl ester having 12 to 30 carbon atoms, preferably 14 to 24 carbon atoms in a principal chain, and it is more preferably a long-chain aliphatic dibasic acid diglycidyl ester having 16 to 22 carbon atoms in a principal chain.

The aliphatic dibasic acid may be saturated aliphatic dibasic acid or unsaturated aliphatic dibasic acid. Also, it may be linear aliphatic dibasic acid or branched aliphatic dibasic acid. When it has a branched chain, the branched chain is preferably a lower alkyl group having 1 to 8 carbon atoms (methyl, ethyl and the like), a substituted or unsubstituted aryl group and an epoxy group.

The above long-chain dibasic acid diglycidyl esters are known, and a production method therefor is known as well. The compounds obtained by various production methods can be used, and commercial products can be used as well if available.

The preferred long-chain dibasic acid diglycidyl ester having 12 to 30 carbon atoms includes, for example, at least one of bis(2,3-epoxylpropyl) dodecanedioate, bis(2,3-epoxylpropyl) eicosadienedioate, bis(2,3-epoxylpropyl) 8,12-eicosadienedioate, bis(2,3-epoxylpropyl) 7-ethyloctadecanedioate, bis(2,3-epoxylpropyl) 12-vinyl-8-octadecenedioate, bis(2,3-epoxylpropyl) 8,11-dimethyl-7,11-octadecadiene-1,18-dicarboxylate, bis(2,3-epoxylpropyl) 8,9-diphenylhexadecanedioate, and the like.

The dibasic acid having 12 to 30 carbon atoms and the derivative thereof used in the present invention have desirably a melting point of preferably 70° C. or lower, more preferably 60° C. or lower in terms of exerting further the effects of the present invention and drawing pictures on a smooth surface. The dibasic acid having 12 to 30 carbon atoms and the derivative thereof used in the present invention can be used even in the form of liquid or paste-like at room temperature, as long as the drawing material is not reduced in strength because of the reasons that the drawing material is prevented from slipping in drawing pictures on a smooth surface as is the case with a liquid such as oil which has so far been used for solid drawing materials and that it is enhanced in a coloring property on the contrary.

A content of at least one selected from the dibasic acids having 12 to 30 carbon atoms and the derivatives thereof used in the present invention falls in a range of preferably 1 to 12% by mass (hereinafter referred to merely as "%"), more preferably 1 to 10% based on the total amount of the solid drawing material.

If the above content is less than 1%, the effects of the present invention including the effect of enhancing the coloring property are not exerted. On the other hand, if it exceeds 12%, the effects of the present invention including the effect of enhancing the coloring property are not further improved furthermore, and the writing performance is rather deteriorated.

The resin which can be used in the present invention shall not specifically be restricted as long as it is selected from rosin and modified products thereof, terpene resins and modified products thereof, petroleum resins, maleic acid resins, coumarone.indene resins and derivatives thereof, and isoprene base resins, and any resins can be used.

The rosin and the modified products thereof described above shall not specifically be restricted as long as they are usually classified into rosin and rosin modified products such as rosin glycerin ester, and any products can be used. Also, abietic acid which is a principal component of rosin can be used as well.

The terpene resins and the modified products thereof described above shall not specifically be restricted as long as they are usually classified into terpene resins and modified products thereof, and any products can be used. An α-pinene resin having a low softening point is preferred from the viewpoint of the softening point. A terpene phenol resin and the like having a high softening point hardens the resulting solid drawing material if a content thereof is high, and therefore it is contained in the resin in a content of preferably about 15% or less.

The petroleum resins described above shall not specifically be restricted to aliphatic petroleum resins (C5), aromatic petroleum resins (C9), dicyclopentadiene base petroleum resins, copolymerized petroleum resins thereof, hydrogenated petroleum resins and the like as long as they are usually classified into petroleum resins, and any products can be used. The aliphatic petroleum resins (C5) having a low softening point are preferred in terms of the softening point and the compatibility with the other blending components.

The maleic acid resins and the derivatives thereof described above shall not specifically be restricted as long as they are usually classified into maleic acid resins and derivatives thereof, and any products can be used.

The coumarone.indene resins and the derivatives thereof described above shall not specifically be restricted as long as they are usually classified into coumarone.indene resins and derivatives thereof, and any products can be used.

The isoprene base resins described above shall not specifically be restricted as long as they are usually classified into isoprene base resins, and any products can be used.

The above resins (the rosin and the modified products thereof to the isoprene base resins each described above) can be used alone or in a mixture of two or more kinds thereof without distinguishing whether or not they are chemicals or natural substances, and they are suitably selected according to a coloring property and hardness of the intended solid drawing material. Further, resins used for solid drawing materials can be used for adjusting the quality such as the strength, the hardness and the writing performance as long as the effects of the present invention are not damaged in such a range that the quality is not lowered.

A content of a mixture comprising at least one selected from the above resins, that is, the rosin and the modified products thereof, the terpene resins and the modified products thereof, the petroleum resins, the maleic acid resins and the derivatives thereof, the coumarone.indene resins and the derivatives thereof, and the isoprene base resins falls in a range of preferably 5 to 20% based on the total amount of the solid drawing material.

If a content of the above resins is less than 5%, the solid drawing material is weak in terms of strength and therefore is not practical. On the other hand, if it exceeds 20%, the solid drawing material is hard, inferior in a fixing property on a smooth surface and insufficient in coloring.

The waxes used in the present invention shall not specifically be restricted as long as they are usually used for solid drawing materials, and capable of being used are at least one of castor wax, Japan wax, sumac wax, Japan sumac wax, montan wax, beef tallow hydrogenated oil, glycerin fatty acid esters, pentaerythritol fatty acid esters, microcrystalline wax, carnauba wax, candelilla wax, rice wax, paraffin wax, ozokerite, Fischer•Tropsch wax, polyethylene wax, polypropylene wax, ketone wax, various fatty acid amides, and the like which have so far been publicly known.

The wax having a melting point of 45° C. or higher and 80° C. or lower is preferably used principally in order to obtain dark drawn lines, and particularly the wax having a melting point of 45° C. or higher and 65° C. or lower is preferably used principally in order to draw dark lines on smooth and non-absorbing surfaces of art paper, coated paper, milk packs, plastics such as PET, metal, glass, white boards, and the like. The term "used principally" described above means that the wax concerned accounts for about 70% or more based on the whole waxes though cannot be definitely referred to in light of the contents of the materials other than the wax and a content of an oil which is liquid at normal temperature and can be used in a range in which the effects of the present invention such as the aimed quality are maintained.

Also, even waxes such as paraffin wax, microcrystalline wax, jojoba oil, natural or synthetic oils such as spindle oils, liquid paraffins, squalane, squalene, α-olefin oligomers, silicone oils and the like, glycerin fatty acid esters, and pentaerythritol fatty acid esters each having a melting point of lower than 45° C. can be used as well in a range in which the effects of the present invention including the aimed quality are maintained.

Solid drawing materials containing a wax having a melting point of 45° C. or lower and materials which are liquid at room temperature other than the dibasic acid having 12 to 30 carbon atoms and the derivative thereof which are used in the present invention slip on smooth surfaces and therefore cannot draw dark lines thereon. In the present invention, however, the solid drawing materials are prevented from slipping on smooth surfaces due to the effect of containing at least one selected from the dibasic acids having 12 to 30 carbon atoms and the derivatives thereof having the physical properties described above, and therefore obtained are the solid drawing materials which are softer by adding the wax having a melting point of 45° C. or lower and the materials to be liquid at room temperature and which can draw darkly pictures on smooth and non-absorbing surfaces of art paper, coated paper, milk packs, plastics such as PET, metal, glass, white boards, and the like. Accordingly, substances having a low melting point and liquids can be used in a range in which the practical strength is obtained.

A content of the above waxes falls in a range of preferably 15 to 60% based on the total amount of the solid drawing material in terms of a balance between the coloring property, the writing performance and the strength.

In the present invention, a mass ratio (A):(B) of at least one (A) selected from the dibasic acids having 12 to 30 carbon atoms and the derivatives thereof to the whole waxes (B) contained in the lead falls in a range of preferably 2:100 to 20:100.

If the above mass ratio (A):(B) is less than 2:100, the effect of enhancing the coloring property is not exerted, and on the other hand, if it exceeds 20:100, the coloring property is not improved furthermore, and the writing performance is rather deteriorated in a certain case.

Capable of being used as the pigment used in the present invention are, for example, all of azo base organic pigments such as disazo yellow AAA and pyrazolone orange, cyanine base organic pigments such as phthalocyanine blue and phthalocyanine green, high grade organic pigments such as quinacridone red, lake pigments such as Fanal color, fluorescent pigments, inorganic pigments such as carbon black, black iron oxide, red iron oxide, Prussian blue and titanium dioxide, and the like.

A content of the above pigments falls in a range of preferably 40% or less based on the total amount of the solid drawing material in terms of a balance between the coloring property, the writing performance and the strength. The above content of the pigments is varied depending on the kind of the solid drawing material. In a case of, for example, a color pencil, pencils of very pale colors to dark colors are available, and therefore a content of the pigment cannot be restricted definitely to the preferred content or less described above in a certain case. It may exceed 40% and is suitably adjusted in a range in which the effects of the present invention are not damaged.

In the solid drawing material of the present invention, when pictures are drawn darkly and clearly on transparent plate surfaces of dark or transparent plastics, glass and the like, titanium dioxide among the pigments described above is preferably contained therein, and all titanium dioxides which have so far been publicly known can be used regardless of, for example, a rutile type and an anatase type. If titanium dioxide has a small particle diameter as is the case with titanium dioxide for catalysts, light pictures are drawn, and therefore an average particle diameter thereof is preferably 100 nm or more, more preferably 200 to 1500 nm.

In the present invention, the average particle diameter means a value of a primary particle measured by observation under an electron microscope.

A content of the above titanium dioxide is preferably 5% or more based on the total amount of the solid drawing material when pictures are drawn darkly and clearly on transparent plate surfaces of dark or transparent plastics, glass and the like.

All publicly known extenders such as, for example, calcium carbonate, kaolin, talc, precipitated barium sulfate, mica, boron nitride, whiskers such as potassium titanate whiskers and basic magnesium sulfate whiskers can be used as the extender used for the solid drawing material of the present invention.

A content of the above extenders is the balance of the resin, the waxes, the pigment and at least one selected from the dibasic acids having 12 to 30 carbon atoms and the derivatives thereof each described above.

In addition, various additives such as surfactants and UV absorbers which have so far been publicly known can suitably be contained in the solid drawing material of the present invention as long as the characteristics of the present invention such as the strength, drawing pictures on smooth and non-absorbing surfaces and the easy erasability which have so far been described are not damaged.

The solid drawing materials having the respective shapes and the respective dimensions (diameter and the like) according to the present invention can be obtained by blending the resin, the waxes, the pigment, the extender and at least one selected from the dibasic acids having 12 to 30 carbon atoms and the derivatives thereof each described above to obtain a blend composition, and heating, mixing and dispersing the blend composition by means of a kneader and the like, then kneading the mixture by means of a two roll mill, and molding the above mixture by means of an optimum molding machine selected from a plunger type extruding machine, an injection molding machine, a cast filling machine and the like in light of the melting point, the melt viscosity and the like.

The solid drawing material obtained in the present invention is used principally for a wood case color pencil prepared by loading the solid drawing material (lead) in a wood case, a pencil or a crayon prepared by winding the above solid drawing material by paper or a sheet capable of being sharpened by a pencil sharpener, a pencil or a crayon prepared by loading the solid drawing material in an outer holder capable of being sharpened by a pencil sharpener, or a solid drawing material composed simply of only the solid drawing material.

The solid drawing material of the present invention thus constituted contains at least the resin, the waxes, the pigment and the extender, and it further contains at least one selected from the dibasic acids having 12 to 30 carbon atoms and the derivatives thereof, wherein used as the resin described above is at least one selected from rosin and modified products thereof, terpene resins and derivatives thereof, petroleum resins, maleic acid resins and derivatives thereof, coumarone.indene resins and derivatives thereof, and isoprene base resins; the dibasic acid having 12 to 30 carbon atoms and the derivative thereof are preferably the dibasic acid having 12 to 30 carbon atoms and the derivative thereof represented by the formula (1) described above, and/or a long-chain dibasic acid diglycidyl ester having 12 to 30 carbon atoms; the dibasic acid having 12 to 30 carbon atoms and the derivative thereof having a melting point of 70° C. or lower are used; a content thereof is controlled to a range of 1 to 12% by mass based on the total amount of the solid drawing material; and a mass ratio (A):(B) of at least one (A) selected from the dibasic acids having 12 to 30 carbon atoms and the derivatives thereof to the whole waxes (B) contained in the solid drawing material is controlled to a range of 2:100 to 20:100, whereby obtained is the solid drawing material which has sufficiently high strength and a smooth writing performance and can draw smoothly, darkly and finely pictures not only on papers such as ordinary wood free paper, drawing paper and copier paper but also particularly on smooth and non-absorbing surfaces of art paper, coated paper, milk packs, plastics such as PET, metal, glass, white boards, and the like as well as eyebrows, lips, skins and the like and which can readily be erased by cloths, papers such as tissue paper and the like, white board erasers when drawn on the non-absorbing surfaces described above.

Further, titanium dioxide is added in an amount of 5% as the pigment to the solid drawing material, whereby pictures can be drawn darkly and clearly on transparent plate surfaces of dark or transparent plastics, glass and the like.

The solid drawing material of the present invention thus constituted shall not be restricted to the embodiment described above and can be varied and embodied in various manners in a scope of the technical concept of the solid drawing material of the present invention.

Water-Soluble Solid Drawing Material: Second Embodiment

The water-soluble solid drawing material of the present invention contains at least one selected from dibasic acids having 12 to 30 carbon atoms and derivatives thereof, a surfactant having a melting point of 45 to 85° C. and an HLB of 12 or more as a wax, a resin, a pigment and an extender.

In the above water-soluble solid drawing material of the present invention, the more preferred embodiment includes the following.

The dibasic acid having 12 to 30 carbon atoms and the derivative thereof are preferably a dibasic acid having 12 to 30 carbon atoms and a derivative thereof represented by the following formula (1):

$$R_2OOC-R_1-COOR_3 \quad (1)$$

wherein $R_1$ is a linear or branched alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

The dibasic acid having 12 to 30 carbon atoms and the derivative thereof are preferably a long-chain dibasic acid diglycidyl ester having 12 to 30 carbon atoms.

The dibasic acid having 12 to 30 carbon atoms and the derivative thereof have a melting point of preferably 70° C. or lower.

A content of the dibasic acid having 12 to 30 carbon atoms and the derivative thereof falls in a range of preferably 1 to 12% by mass based on the total amount of the solid drawing material.

The surfactant having a melting point of 45 to 85° C. and an HLB of 12 or more is preferably contained as the wax in a content of 50% or more based on the whole waxes.

A mass ratio (A):(B) of at least one (A) selected from the dibasic acids having 12 to 30 carbon atoms and the derivatives thereof to the whole waxes (B) contained in the solid drawing material falls preferably in a range of 2.5:100 to 18:100.

The resin is a water-soluble resin which is completely dissolved in water.

Also, the resin has preferably a melting point or a softening point of 100° C. or lower in a dry state.

At least one selected from the dibasic acids having 12 to 30 carbon atoms and the derivatives thereof which are used for the water-soluble solid drawing material of the present invention is a component which allows the solid drawing material to draw pictures on a smooth surface and to exert a sufficiently high strength, and any ones can be used without restrictions as long as they are included in the category of the dibasic acids having 12 to 30 carbon atoms and the derivatives thereof.

The dibasic acid having 12 to 30 carbon atoms and the derivative thereof which can be used includes the dibasic acids having 12 to 30 carbon atoms and the derivatives thereof represented by the above formula (1), and the long-chain dibasic acid diglycidyl esters having 12 to 30 carbon atoms which have been described in detail in the embodiment of the foregoing solid drawing material.

The explanations of the dibasic acids having 12 to 30 carbon atoms and the derivatives thereof represented by the above formula (1) which can be used are same as the contents described in detail in the embodiment of the foregoing solid drawing material, and therefore the explanations thereof shall be omitted.

A content of at least one selected from the dibasic acids having 12 to 30 carbon atoms and the derivatives thereof which are used for the water-soluble solid drawing material of the present invention falls in a range of preferably 1 to 12%, more preferably 1 to 10% based on the total amount of the water-soluble solid drawing material.

If the above content is less than 1%, the effects of the present invention including the effect of enhancing the coloring property are not exerted. On the other hand, if it exceeds 12%, the effects of the present invention including the effect of enhancing the coloring property are not improved furthermore, and the writing performance is rather deteriorated.

The resin used for the water-soluble solid drawing material of the present invention shall not specifically be restricted as long as it has so far been used for non-calcined color pencil leads or solid drawing materials, and capable of being used are, for example, any of synthetic and natural water-soluble resins such as polyethylene oxide, polyethylene oxide-polypropylene oxide copolymers, water-soluble nylons, carboxymethyl cellulose or salts thereof, methyl cellulose, polyvinyl alcohol, starch, gum arabic, tragacanth gum and guar gum, rosin and/or rosin-modified substances such as glycerin esters of rosin, ethyl cellulose, polyvinyl acetal resins such as polyvinyl butyral, polyethylene, polypropylene, polystyrene, celluloid, diallyl phthalate (DPA)

resins, epoxy resins, and the like. They can be used alone or in a mixture of two or more kinds thereof without distinguishing whether or not they are chemicals or natural substances.

Non-water-soluble resins are a cause of reducing solubility of pictures drawn on surfaces, and therefore preferably water-soluble resins are principally used. However, for the purpose of inhibiting the water-soluble solid drawing material of the present from absorbing moisture in storage, capable of being suitably mixed are non-water-soluble resins such as rosin and modified products thereof, terpene resins and modified products thereof, petroleum resins, maleic acid resins and derivatives thereof, coumarone.indene resins and derivatives thereof, isoprene base resins, ethyl cellulose, polyvinyl acetal resins, polyethylene, polypropylene and polystyrene, which are publicly known.

The term "used principally" described above means that the water-soluble resin accounts for about 70% or more based on the resins, though cannot be definitely referred to, in light of the contents of the components other than the resins. Also, in the present invention, the water-soluble resin means resins which are completely dissolve (100% dissolve) in water.

Among the foregoing water-soluble resins which can be used, carboxymethyl cellulose or salts thereof, methyl cellulose, polyvinyl alcohol, starch, gum arabic, tragacanth gum, guar gum, and the like do not have thermoplasticity in a dry state or have a high softening point and a high melting point, and therefore when mixed with the dibasic acid having 12 to 30 carbon atoms and the derivative thereof, the surfactant, the pigment and the extender, water has to be added to dissolve the resin, so that water has to be removed after molding. However, if the water-soluble solid drawing material has as large diameter as 5 mm or more, it is hard to remove water contained in the inside thereof, and therefore in such case, the water-soluble resin represented by polyethylene oxide, polyethylene oxide-polypropylene oxide copolymers, water-soluble nylons and the like which have a melting point or softening of 100° C. or lower in a dry state is preferably selected.

A content of the above resins cannot definitely be restricted a range thereof since they are different in a quality such as strength and hardness, and it is controlled in a range of 2 to 35% based on the total amount of the water-soluble solid drawing material.

If a content of the above resins is less than 2%, the effect for forming the lead body is not exerted, and on the other hand, if it exceeds 35%, the lead is hard, inferior in a fixing property on a smooth surface and unsatisfactory in coloring in a certain case.

In the water-soluble solid drawing material of the present invention, the surfactant having a melting point of 45 to 85° C. and an HLB of 12 or more is used as the wax in terms of compatibility between the qualities of drawing dark pictures on smooth and non-absorbing surfaces of art paper, coated paper, milk packs, plastics such as PET, metals, glass, white boards, and the like and dissolving well the drawing material in water.

The surfactant having a melting point of 45 to 85° C. and an HLB of 12 or more which can be used includes, for example, at least one of polyoxyethylene alkyl ethers such as polyoxyethylene oleyl ether, polyoxyethylene stearyl ether, polyoxyethylene cetyl ether, polyoxyethylene behenyl ether, and the like, polyethylene glycol fatty acid esters such as polyethylene glycol monostearate (PEG monostearate), and polyoxyethylene hydrogenated castor oil.

If an organic pigment having low durability is assumed to be used for multicolor as the colorant, the surfactant used in the water-soluble solid drawing material of the present invention is preferably a nonionic type, and preferably used are polyoxyethylene alkyl ethers such as polyoxyethylene oleyl ether, polyoxyethylene stearyl ether, polyoxyethylene cetyl ether and polyoxyethylene behenyl ether, polyethylene glycol fatty acid esters such as polyethylene glycol monostearate (PEG monostearate), and polyoxyethylene hydrogenated castor oil, and the like.

The "HLB value" in the present invention can be determined by a Kawakami method (HLB value=7+11.7 log (MW/MO), MW: molecular weight of hydrophilic part, and MO: molecular weight of lipophilic part).

In the water-soluble solid drawing material of the present invention, while the surfactant having a melting point of 45 to 85° C. and an HLB of 12 or more described above is used as the wax, a surfactant having a melting point of 45 to 85° C. and an HLB deviating from a range of 12 more and a non-aqueous wax may be contained in order to adjust the solubility, the strength and the writing performance as long as the effects of the present invention are not damaged.

However, even when a surfactant having an HLB of less than 12 is used, it has a melting point of preferably 85° C. or lower in terms of the writing performance and the coloring property.

To show the examples of the usable non-aqueous wax, capable of being used are any ones of castor wax, Japan wax, sumac wax, Japan sumac wax, montan wax, beef tallow hydrogenated oil, triglycerin fatty acid esters, pentaerythritol fatty acid esters, microcrystalline wax, carnauba wax, candelilla wax, rice wax, paraffin wax, ozokerite, Fischer•Tropsch wax, polyethylene wax, polypropylene wax, ketone wax, various fatty acid amides, and the like which have so far been publicly known as long as they are usually used for solid drawing materials.

Also, capable of being used as well are surfactants having a melting point of less than 45° C. and an HLB of 12 or more other than the non-aqueous waxes described above, for example, polyoxyethylene coconut oil fatty acid sorbitan, and surfactants having an HLB of less than 12, for example, propylene glycol fatty acid esters, glycerin fatty acid esters, polyoxyethylene sorbit beeswax, and the like. Further, natural or synthetic oils such as jojoba oil, spindle oils, liquid paraffins, squalane, squalene, α-olefin oligomers and silicone oils can be used as well in order to adjust the strength and the writing performance in a range in which the effects of the present invention such as maintaining the aimed quality are not damaged.

Further, polyethylene glycol which is classified into a water-soluble wax can suitably be used as well.

Also, conventionally solid drawing materials blended with a material having a melting point of 45° C. or lower and a material which is liquid at room temperature slip on a smooth surface and therefore cannot draw dark lines thereon. In the present invention, however, the solid drawing materials are inhibited from slipping on smooth surfaces due to the effect of containing the dibasic acid having 12 to 30 carbon atoms and the derivative thereof, and therefore obtained are the water-soluble solid drawing materials which are softer by containing the material having a melting point of 45° C. or lower and the material to be liquid at room temperature and which can draw dark pictures on smooth and non-absorbing surfaces of art paper, coated paper, milk packs, plastics such as PET, metal, glass, white boards, and the like. Accordingly, materials having a low melting point and liquids can be used in a range in which the practical strength is obtained.

The contents of the non-aqueous wax, the surfactant having a melting point of less than 45° C. and an HLB of 12 or more, the surfactant having an HLB of less than 12, the natural or synthetic oil, the low melting point material, and the liquid are, in light of solubility of the water-soluble solid drawing material obtained, preferably less than 50%, more preferably less than 30% based on the total amount of the waxes.

A content of the above whole waxes falls in a range of preferably 15 to 60% based on the total amount of the water-soluble solid drawing material.

In light of solubility of the water-soluble solid drawing material obtained, a ratio of the surfactant having a melting point of 45 to 85° C. and an HLB of 12 or more is preferably 50% or more, more preferably 70% or more based on the total amount of the waxes.

In the water-soluble solid drawing material of the present invention, a mass ratio (A):(B) of the dibasic acid having 12 to 30 carbon atoms and the derivative thereof (A) to the whole waxes (the total amount of the surfactant having a melting point of 45 to 85° C. and an HLB of 12 or more, a surfactant outside the ranges described above, and the non-aqueous wax) (B) contained in the water-soluble solid drawing material falls in a range of preferably 2.5:100 to 18:100.

If the above ratio (A):(B) is less than 2.5:100, an effect of enhancing the coloring property is not exerted. On the other hand, if it exceeds 18:100, the coloring property is not enhanced furthermore, and such adverse effects that the writing performance is deteriorated and that the water solubility is reduced are involved therein.

Capable of being used as the colorant used for the water-soluble solid drawing material of the present invention are, for example, azo base organic pigments such as bisazo yellow AAA and pyrazolone orange, cyanine base organic pigments such as phthalocyanine blue and phthalocyanine green, high grade organic pigments such as quinacridone red, lake pigments such as Fanal color and fluorescent pigments, inorganic pigments such as carbon black, black iron oxide, red iron oxide, Prussian blue, titanium dioxide of a rutile type and an anatase type, and dyes.

A content of the above colorants falls in a range of preferably 40% or less based on the total amount of the solid drawing material in terms of a balance between the coloring property, the writing performance and the strength. The above content of the colorants is varied depending on the kind of the water-soluble solid drawing material. In a case of, for example, a water-soluble color pencil, pencils of pale colors to dark colors are available, and therefore a content of the pigment cannot be restricted definitely to the preferable content described above in a certain case. It may exceed 40% and is suitably adjusted in a range in which the effects of the present invention are not damaged.

All publicly known extenders such as, for example, calcium carbonate, kaolin, talc, precipitated barium sulfate, mica, boron nitride, whiskers such as potassium titanate whiskers and basic magnesium sulfate whiskers can be used as the extender used for the water-soluble solid drawing material of the present invention.

A content of the above extenders is a balance of the resin, the waxes, the colorant and at least one selected from the dibasic acids having 12 to 30 carbon atoms and the derivatives thereof.

In addition, various additives such as UV absorbers which have so far been publicly known can suitably be contained as long as the effects of the present invention such as the strength, drawing pictures on smooth and non-absorbing surfaces and the good water solubility which have so far been described are not reduced.

The water-soluble solid drawing materials having the respective shapes and the respective dimensions (diameter and the like) according to the present invention can be obtained by blending at least one selected from the dibasic acids having 12 to 30 carbon atoms and the derivatives thereof, the surfactant having a melting point of 45 to 85° C. and an HLB of 12 or more as the wax, the resin, the colorant and the extender to obtain a blend composition, and adding water, if necessary, to the blend composition, mixing it by means of a heating mixer, or kneading the blend composition by means of a kneading machine such as a kneader and a roll mill to turn it to a molten state, followed by casting the molten substance into a mold and then cooling or subjecting to injection-molding or extrusion molding, and then drying it if necessary.

The water-soluble solid drawing material obtained in the present invention is used principally for a wood case color pencil, a color pencil or a crayon prepared by winding a lead by paper or a sheet capable of being sharpened by a pencil sharpener, a color pencil or a crayon prepared by loading the water soluble solid drawing material in an outer holder capable of being sharpened by a pencil sharpener, or used as a solid drawing material composed simply of only the water-soluble solid drawing material.

The water-soluble solid drawing material of the present invention thus constituted contains at least one selected from the dibasic acids having 12 to 30 carbon atoms and the derivatives thereof, the surfactant having a melting point of 45 to 85° C. and an HLB of 10 or more as the wax, the resin, the colorant and the extender, wherein the dibasic acid having 12 to 30 carbon atoms and the derivative thereof are preferably the dibasic acid and the derivative thereof represented by the formula (1) described above, and/or a long-chain dibasic acid diglycidyl ester having 12 to 30 carbon atoms; the dibasic acid having 12 to 30 carbon atoms and the derivative thereof having a melting point of 70° C. or lower are used; a content thereof is controlled to a range of 1 to 12% by mass based on the total amount of the solid drawing material; a mass ratio (A):(B) of at least one (A) selected from the dibasic acids having 12 to 30 carbon atoms and the derivatives thereof to the whole waxes (B) contained in the water-soluble solid drawing material is controlled to a range of 2.5:100 to 18:100; the resin is a water-soluble resin which is completely dissolved in water; and a melting point or a softening point in a dry state of the above water-soluble resin is controlled to 100° C. or lower, whereby obtained is the water-soluble solid drawing material which has sufficiently high strength and a smooth writing performance and can draw remarkably dark pictures not only on ordinary painting paper such as drawing paper but also on smooth and non-absorbing surfaces of art paper, coated paper, milk packs, plastics such as PET, metal, glass, white boards, and the like and which is dissolved readily and evenly on drawn surfaces by tracing the drawn surfaces with a brush soaked with water after drawing pictures to provide the drawn surfaces similar to watercolor paints.

The water-soluble solid drawing material of the present invention thus constituted shall not be restricted to the embodiment described above and can be varied and embodied in various manners in a scope of the technical concept of the present invention.

Solid Drawing Material for a Non-Calcined Color Pencil Lead: Third Embodiment The solid drawing material for a non-calcined color pencil lead (hereinafter referred to as a non-calcined color pencil lead) according to the present invention is a non-calcined color pencil lead containing at least a resin, waxes, a colorant and an extender, wherein it further contains at least one selected from dibasic acids having 12 to 30 carbon atoms and a derivative thereof, and the resin described above contains at least one selected from any one group of four groups of a) to d) shown below:
a) ethyl cellulose, polyvinyl acetal resins, polyethylene, polypropylene, and polystyrene,
b) synthetic or natural water-soluble resins such as carboxymethyl cellulose or salts thereof, methyl cellulose, polyvinyl alcohol, starch, gum arabic, tragacanth gum, and guar gum,
c) celluloid,
d) diallyl phthalate resins and epoxy resins In the above non-calcined color pencil lead, the further preferred embodiment includes the followings.

The dibasic acid having 12 to 30 carbon atoms and the derivative thereof are preferably a dibasic acid and a derivative thereof represented by the following formula (1):

$$R_2OOC-R_1-COOR_3 \quad (1)$$

wherein $R_1$ is a linear or branched alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

The dibasic acid having 12 to 30 carbon atoms and the derivative thereof are preferably a long-chain dibasic acid diglycidyl esters having 12 to 30 carbon atoms.

The dibasic acid having 12 to 30 carbon atoms and the derivative thereof have a melting point of preferably 70° C. or lower.

A content of the dibasic acid having 12 to 30 carbon atoms and the derivative thereof falls in a range of preferably 1 to 10% by mass based on the total amount of the non-calcined color pencil lead.

A mass ratio (A):(B) of at least one (A) selected from the dibasic acid having 12 to 30 carbon atoms and the derivative thereof to the whole waxes (B) contained in the non-calcined color pencil lead falls in a range of preferably 3:100 to 16:100.

At least one selected from the dibasic acids having 12 to 30 carbon atoms and the derivatives thereof which are used for the non-calcined color pencil lead of the present invention is a component which allows the pencil lead to draw pictures on a smooth surface and exert sufficiently high strength, and any ones can be used without specific limitations as long as they are included in the category of the dibasic acids having 12 to 30 carbon atoms and the derivatives thereof.

The dibasic acid having 12 to 30 carbon atoms and the derivative thereof which can be used include, for example, the dibasic acids having 12 to 30 carbon atoms and the derivatives thereof represented by the formula (1) described above, and the long-chain dibasic acid glycidyl esters having 12 to 30 carbon atoms which are described in detail in the embodiment of the solid drawing material described above.

The explanations of the dibasic acid having 12 to 30 carbon atoms and the derivative thereof represented by the formula (1) described above which can be used are same as the contents described in detail in the embodiment of the foregoing solid drawing material, and therefore the explanations thereof shall be omitted.

A content of at least one selected from the dibasic acids having 12 to 30 carbon atoms and the derivatives thereof which are used in the present invention falls in a range of preferably 1 to 10% by mass (hereinafter referred to merely as "%"), more preferably 1 to 8% based on the total amount of the non-calcined color pencil lead.

If the above content is less than 1%, the effects of the present invention including the effect of enhancing the coloring property are not exerted. On the other hand, if it exceeds 10%, the effects of the present invention including the effect of enhancing the coloring property are not improved furthermore, and the writing performance is rather deteriorated.

The resin which can be used for the non-calcined color pencil lead of the present invention shall not specifically be restricted as long as it is included in the four groups of a) to d) shown below:
a) ethyl cellulose, a polyvinyl acetal resins, polyethylene, polypropylene, and polystyrene,
b) synthetic or natural water-soluble resins such as carboxymethyl cellulose or salts thereof, methyl cellulose, polyvinyl alcohol, starch, gum arabic, tragacanth gum, and guar gum,
c) celluloid,
d) diallyl phthalate resins and epoxy resins In the a) group described above, a polyvinyl butyral resin is included in the polyvinyl acetal resins, and low density polyethylene and high density polyethylene can be used for polyethylene. A Na salt and the like can be used for the carboxymethyl cellulose salts of the b) group described above.

In the non-calcined color pencil lead of the present invention, if the resins are included in the same group among the four groups of a) to d) described above, at least one kind and plural kinds of the resins can be mixed. If the resins are included in the different groups, it has to be confirmed whether or not they can be used in a mixture since the production methods thereof are a little different. That is, the resins belonging to the a) group can be mixed with the other blending components by heating; the resins belonging to the b) group have to be dissolved in water, mixed, molded and then dried; the resins belonging to the c) group have to be dissolved in an organic solvent, mixed, molded and then dried; and the resins belonging to the d) group have to be mixed, molded and then cured by heating.

If the resins selected from the four groups described above are used, even resins which do not correspond to the four groups of a) to d) described above can be used as an optional component in order to control the quality such as the strength, the hardness, the writing performance and the like in a range in which the effects of the present invention are not damaged so that the quality is not reduced.

A content of at least one of the resins in any one group of the four groups of a) to d) cannot definitely be restricted a range thereof since they are different in a quality such as strength and hardness, and it is controlled in a range of 2 to 50% based on the total amount of the non-calcined color pencil lead.

If a content of the above resins is less than 2%, the effect of forming the lead body is not exerted, and on the other hand, if it exceeds 50%, the lead body is hard and is not abraded on a writing surface to make writing impossible in a certain case.

The waxes used for the non-calcined color pencil lead of the present invention shall not specifically be restricted as long as they are usually used for non-calcined color pencil leads, and capable of being used are at least one of castor wax, Japan wax, sumac wax, Japan sumac wax, montan wax, beef tallow hydrogenated oil, glycerin fatty acid esters, pentaerythritol fatty acid esters, microcrystalline wax, carnauba wax, candelilla wax, rice wax, paraffin wax, ozokerite, Fischer•Tropsch wax, polyethylene wax, polypropylene wax, ketone wax and various fatty acid amides, and the like which have so far been publicly known.

The wax having a melting point of 45° C. or higher and 80° C. or lower is preferably used in order to obtain dark drawn lines, and particularly, the wax having a melting point of 45° C. or higher and 65° C. or lower is preferably used principally in order to draw dark lines on smooth and non-absorbing surfaces of art paper, coated paper, milk packs, plastics such as PET, metal, glass, white boards. The term "used principally" described above means that the wax concerned accounts for about 70% or more based on the whole waxes though cannot be definitely referred to, in light of the contents of the materials other than the wax and a content of an oil which is liquid at normal temperature and can be used in a range in which the effects of the present invention such as the aimed quality are maintained.

A content of the above waxes falls in a range of preferably 15 to 60% based on the total amount of the non-calcined color pencil lead in terms of a balance between the coloring property, the writing performance and the strength.

In the non-calcined color pencil lead of the present invention, a mass ratio (A):(B) of at least one (A) selected from the dibasic acids having 12 to 30 carbon atoms and the derivatives thereof to the whole waxes (B) contained in the lead falls in a range of preferably 3:100 to 16:100.

If the above mass ratio (A):(B) is less than 3:100, the effect of enhancing the coloring property is not exerted, and on the other hand, if it exceeds 16:100, the effect of enhancing the coloring property is not improved furthermore, and the writing performance is rather deteriorated in a certain case.

Capable of being used as the colorant used for the non-calcined color pencil lead of the present invention are, for example, azo base organic pigments such as bisazo yellow AAA and pyrazolone orange, cyanine base organic pigments such as phthalocyanine blue and phthalocyanine green, high grade organic pigments such as quinacridone red, lake pigments such as Fanal color, fluorescent pigments, inorganic pigments such as carbon black, black iron oxide, red iron oxide, Prussian blue, titanium dioxide of a rutile type and an anatase type, and dyes.

A content of the above colorants falls in a range of preferably 40% or less based on the total amount of the non-calcined color pencil lead in terms of a balance between the coloring property, the writing performance and the strength. The content of the colorants is varied depending on the uses such as a wood case pencil, a mechanical pencil and the like, and pencils of pale colors to dark colors are available. Accordingly, a content of the colorant cannot definitely be restricted to the preferred content described above in a certain case, and it may exceed 40% and is suitably adjusted in a range in which the effects of the present invention are not damaged.

All publicly known extenders such as, for example, calcium carbonate, kaolin, talc, precipitated barium sulfate, mica, boron nitride, whiskers such as potassium titanate whiskers and basic magnesium sulfate whiskers can be used as the extender for the non-calcined color pencil lead of the present invention.

A content of the above extenders is a balance of the resin, the waxes, the colorant and at least one selected from the dibasic acids having 12 to 30 carbon atoms and the derivatives thereof.

In addition, various additives such as surfactants and UV absorbers which have so far been publicly known can be blended in the non-calcined color pencil lead of the present invention as long as the quality is not reduced, and an oil to be liquid at room temperature and the like which have so far been publicly known can suitably be contained in a range in which the aimed quality can be maintained.

The non-calcined color pencil lead of the present invention is a little different in a production method if the group is different in selecting the resins from the four groups of a) to d) described above. That is, when the resin of the group a) described above is used, the non-calcined color pencil leads having the respective shapes and the respective dimensions (diameter and the like) can be obtained by blending the waxes, the colorant, the extender and at least one selected from the dibasic acids having 12 to 30 carbon atoms and the derivatives thereof with the above resin to obtain a blend composition, and then heating, mixing and dispersing the blend composition by means of a kneader and the like, kneading the mixture by means of a two roll mill, and molding the above mixture by means of an optimum molding machine selected from a plunger type extruding machine, a screw type extruding machine, an injection molding machine, a cast filling machine and the like in light of the melting point, the melt viscosity and the like. Also, the blend composition is divided into two kinds, for example, blend composition A prepared by blending the waxes, the colorant and the extender with the above resin and blend composition B prepared by blending the waxes and at least one selected from the dibasic acids having 12 to 30 carbon atoms and the derivatives thereof with the above resin, and two kinds of the blend compositions which are mixed and crushed are heated and mixed in the same manners as described above, whereby the non-calcined color pencil leads having the respective shapes and the respective dimensions (diameter and the like) can be obtained.

When the resin of the group b) described above is used, the non-calcined color pencil leads having the respective shapes and the respective dimensions (diameter and the like) can be obtained by blending the waxes, the colorant, the extender, at least one selected from the dibasic acids having 12 to 30 carbon atoms and the derivatives thereof and water with the above resin to obtain a blend composition, and then heating, mixing and dispersing the blend composition by means of a kneader and the like, kneading the mixture by means of a two roll mill, and molding in the same manner as described above the above mixture by means of an optimum molding machine selected from a plunger type extruding machine, a screw type extruding machine and the like in light of the melting point.

When the resin of the group c) described above is used, the non-calcined color pencil leads having the respective shapes and the respective dimensions (diameter and the like) can be obtained by blending the waxes, the colorant, the extender, at least one selected from the dibasic acids having 12 to 30 carbon atoms and the derivatives thereof, and an organic solvent such as methyl ethyl ketone, ethyl acetate, butyl acetate, methanol, ethanol, i-propanol and ethyl cellosolve with the above resin to obtain a blend composition, or preparing in advance two kinds of blend compositions in the same manner as described above, mixing and dispersing them by means of a mixer and the like, then kneading the mixture by means of a two roll mill, molding the mixture by means of a molding machine such as a plunger type extruding machine, and further removing the organic solvent described above.

When the resin of the group d) described above is used, the non-calcined color pencil leads having the respective shapes and the respective dimensions (diameter and the like) can be obtained by blending the waxes, the colorant, the extender and at least one selected from the dibasic acids having 12 to 30 carbon atoms and the derivatives thereof with the above resin to obtain a blend composition, and then mixing and dispersing the blend composition by means of a mixer and the like, kneading the mixture by means of a two roll mill, molding the mixture by means of an optimum molding machine selected from a plunger type extruding machine and a screw type extruding machine, and then heating and curing the molded product at 110 to 140° C.

The non-calcined color pencil lead obtained in the present invention is used in the form of a wood case color pencil prepared by loading the non-calcined color pencil lead in a wood case, or by loading the non-calcined color pencil lead in a mechanical pencil and a lead holder.

The non-calcined color pencil lead of the present invention thus constituted is a solid drawing material containing at least the resin selected from the four groups of a) to d) described above, the waxes, the pigment and the extender, and it further contains at least one selected from the dibasic acids having 12 to 30 carbon atoms and the derivatives thereof, wherein the dibasic acid having 12 to 30 carbon atoms and the derivative thereof are preferably the dibasic acid having 12 to 30 carbon atoms and the derivative thereof represented by the formula (1) described above, and/or a long-chain dibasic acid diglycidyl ester having 12 to 30 carbon atoms; the dibasic acid having 12 to 30 carbon atoms and the derivative thereof having a melting point of 70° C. or lower are used; a content thereof is controlled to a range of 1 to 10% based on the total amount of the solid drawing material; and a mass ratio (A):(B) of at least one (A) selected from the dibasic acids having 12 to 30 carbon atoms and the derivatives thereof to the whole waxes (B) contained in the solid drawing material is controlled to a range of 3:100 to 16:100, whereby obtained is the non-calcined color pencil lead which has sufficiently high strength and a smooth writing performance and can draw remarkably darkly pictures not only on ordinary painting paper such as drawing paper, and canvases for oil paintings but also on smooth and non-absorbing surfaces of art paper, coated paper, milk packs, plastics such as PET, metal, glass, white boards, and the like.

According to the non-calcined color pencil lead of the present invention, provided is the non-calcined color pencil lead which has sufficiently high strength and a smooth writing performance and can draw remarkably dark pictures not only on ordinary painting paper such as drawing paper, and canvases for oil paintings but also on smooth and non-absorbing surfaces of art paper, coated paper, milk packs, plastics such as PET, metal, glass, white boards, and the like.

The non-calcined color pencil lead of the present invention thus constituted shall not be restricted to the embodiment described above and can be varied and embodied in various manners in a scope of the technical concept of the present invention.

Solid Drawing Material for a Calcined Pencil Lead: Fourth Embodiment

The solid drawing material for a calcined pencil lead (hereinafter referred to as a calcined pencil lead) according to the present invention is a calcined pencil lead prepared by impregnating open pores with an oil or a non-volatile ink, wherein at least one selected from dibasic acids having 12 to 30 carbon atoms and derivatives thereof is contained in the oil or non-volatile ink described above.

In the above calcined pencil lead, the further preferred embodiment includes the followings.

The dibasic acid having 12 to 30 carbon atoms and the derivative thereof are preferably dibasic acid and a derivative thereof represented by the following formula (1):

$$R_2OOC-R_1-COOR_3 \quad (1)$$

wherein $R_1$ is a linear or branched alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

The dibasic acid having 12 to 30 carbon atoms and the derivative thereof are preferably a long-chain dibasic acid diglycidyl ester having 12 to 30 carbon atoms.

The dibasic acid having 12 to 30 carbon atoms and the derivative thereof have a melting point of preferably 60° C. or lower.

A content of the dibasic acid having 12 to 30 carbon atoms and the derivative thereof falls in a range of preferably 0.1 to 8% by mass based on total amount of the calcined pencil lead.

A mass ratio (A):(B) of at least one (A) selected from the dibasic acids having 12 to 30 carbon atoms and the derivatives thereof to the total amount (B) of the oil or the non-volatile ink with which the calcined pencil lead is impregnated falls in a range of preferably 3:100 to 30:100.

A surfactant having a melting point of 55° C. or lower and an HLB of 12 or more is preferably contained in a content of 40% by mass or more based on the total amount of the oil or the non-volatile ink with which the calcined pencil lead is impregnated.

At least one (A) selected from the dibasic acids having 12 to 30 carbon atoms and the derivatives thereof used for the calcined pencil lead of the present invention is a component providing a calcined pencil lead which can draw remarkably dark and smooth pictures even on smooth and non-absorbing surfaces of art paper, coated paper, plastics, metal, glass, white boards and the like as well as paper of a notebook, a memo pad and the like having high smoothness, and any ones can be used without specific limitations as long as they are included in the category of the dibasic acids having 12 to 30 carbon atoms and the derivatives thereof.

The dibasic acid having 12 to 30 carbon atoms and the derivative thereof which can be used include the dibasic acids having 12 to 30 carbon atoms and the derivatives thereof represented by the foregoing formula (1), and the long-chain dibasic acid diglycidyl esters having 12 to 30 carbon atoms which have been described in detail in the embodiment of the solid drawing material described above.

The explanations of the dibasic acid having 12 to 30 carbon atoms and the derivative thereof represented by the formula (1) described above which can be used are same as the contents described in detail in the embodiment of the foregoing solid drawing material, and therefore the explanations thereof shall be omitted.

A content of at least one selected from the dibasic acids having 12 to 30 carbon atoms and the derivatives thereof described above which are used for the calcined pencil lead of the present invention falls in a range of preferably 0.1 to 8%, more preferably 1 to 8% based on the total amount of the calcined pencil lead.

If the above content is less than 0.1%, the effects of the present invention including the effect of enhancing the coloring property are not exerted. On the other hand, if it exceeds 8%, the effects of the present invention including the effect of enhancing the coloring property are not improved furthermore, and the writing performance is rather deteriorated.

For a calcined pencil lead body before impregnated with the oil or the non-volatile ink containing at least one selected from the dibasic acids having 12 to 30 carbon atoms and the derivatives thereof described above which are used for the calcined pencil lead of the present invention, capable of being used are calcined pencil lead bodies of black leads and color leads which have so far been known without restriction to a production method, a structure and the like as long as it is a lead body having open pores having a pore diameter which makes it possible to impregnate the pores with the oil or the non-volatile ink.

In a case of, for example, a calcined pencil lead body which is a black lead, given is a production method in which a compound comprising a binder selected from clay, a natural polymer, a synthetic polymer, pitch, asphalt and the like, powder selected from natural crystalline graphite, natural amorphous graphite, artificial graphite, carbon black, boron nitride and the like, and, if necessary, additives such as a plasticizer and a solvent is kneaded, extrusion molded and in which the molded product is then dried up, if necessary, to remove the solvent and the like, and in which it is heated at a high temperature of 800° C. or higher in a non-oxidative atmosphere.

Also, in a case of a calcined pencil lead body which is a color lead, given are a production method in which a compound comprising, for example, a binder selected from clay, a natural polymer, a synthetic polymer, pitch, asphalt and the like, boron nitride, if necessary, powder selected from natural crystalline graphite, natural amorphous graphite, artificial graphite, carbon black and the like, and additives such as a plasticizer and a solvent is kneaded, extrusion molded, in which the molded product is then dried up, if necessary, to remove the solvent and the like, in which it is heated at a high temperature of 800° C. or higher in a non-oxidative atmosphere, in which it is further heated at 800° C. or lower in an ambient atmosphere, in which it is then dipped in a solution selected from polymetalloxane such as perhydropolysilazane, polysiloxane, polyaluminoxane and polyzirconoxane, a silicon chelate, an aluminum chelate, a zirconium chelate, and the like, and heated subsequently at a high temperature of 700° C. or higher in a non-oxidative atmosphere and in which it is then impregnated with a non-volatile dye ink and the like, and a production method in which a compound comprising clay, boron nitride, if necessary, powder selected from natural crystalline graphite, natural amorphous graphite, artificial graphite, carbon black and the like, and additives such as a solvent and the like is kneaded with water and the like, extrusion molded, in which the molded product is then dried up, if necessary, to remove water, in which it is heated at a high temperature of 800° C. or higher in a non-oxidative atmosphere and in which it is further impregnated with a non-volatile dye ink and the like.

In addition, various additives such as UV absorbers which have so far been publicly known can suitably be blended with the foregoing respective compounds in a range in which the effects of the present invention are not damaged including a range in which the aimed quality is not reduced.

In the calcined pencil lead of the present invention, a content of at least one selected from the dibasic acids having 12 to 30 carbon atoms and the derivatives thereof is controlled, as described above, preferably to 0.1 to 8% by mass based on the total amount of the calcined pencil lead in order to obtain an effect of adding the dibasic acid having 12 to 30 carbon atoms and the derivative thereof. Preferred is a lead body having open pores in which an impregnation substance, that is, an impregnation substance containing at least one selected from the dibasic acid having 12 to 30 carbon atoms and the derivatives thereof in the oil or the non-volatile ink to be impregnated can be charged in an amount of 3% or more, and in order to obtain the effect more, preferred is a lead body having open pores in which the impregnation substance can be charged in an amount of 5% or more. A lead body having open pores in which the impregnation substance can be charged in an amount of 8% or more is further preferred, and a lead body in which the whole impregnation substance containing at least one selected from the dibasic acids having 12 to 30 carbon atoms and the derivatives thereof can be charged in a charge amount of 40% or less as an upper limit is designed preferably in terms of a balance between the writing performance and the strength.

In preparing a lead body having open pores in which the impregnation substance containing at least one selected from the dibasic acids having 12 to 30 carbon atoms and the derivatives thereof can be charged in the preferred amounts described above, the use amounts of the raw materials used (the binder, the powder selected from boron nitride and the like, and the additives such as the plasticizer and the solvent) and the calcining conditions such as the heating rate and the atmosphere are suitably combined to carry out the calcination, whereby a lead body having open pores having a prescribed pore diameter can be obtained.

In the calcined pencil lead of the present invention, the impregnation substance (impregnation liquid) containing at least one selected from the dibasic acids having 12 to 30 carbon atoms and the derivatives thereof in the oil or the non-volatile ink is filled in the open pores having a prescribed pore diameter obtained above, whereby the calcined pencil lead is obtained.

Oils which have so far been publicly known, for example, whale oil, lard, spindle oil, liquid paraffin, an α-olefin oligomer, dimethyl silicone oil and the like can be used as the oil used for the calcined pencil lead of the present invention without specific limitations.

Materials which have so far been publicly known as non-volatile liquids as well as colorants such as dyes, and the like can be used for the non-volatile ink used for the calcined pencil lead of the present invention without specific limitations.

The non-volatile liquids which can be used are preferably oleyl alcohol, polyethylene glycol fatty acid esters having an HLB of less than 15 and polyoxyethylene alkyl ethers having an HLB of less than 15 in terms of the writing performance and the erasability, and when leads providing drawn lines which are soluble in water are prepared, polyethylene glycol fatty acid esters having an HLB of 15 or more or polyoxyethylene alkyl ethers having an HLB of 15 or more can be used to exert the water solubility.

Further, oleyl alcohol, polyethylene glycol monooleic acid ester having an HLB of less than 15 and polyoxyethylene oleyl ether having an HLB of less than 15 are particularly preferred in terms of the written line intensity related to solubility of the dye.

The dye used in the present invention shall not specifically be restricted as long as it can be dissolved in the non-volatile liquids shown above as the examples or non-volatile liquids which have so far been publicly known, and all of them can be used.

In the calcined pencil lead of the present invention, the surfactant having a melting point of 55° C. or lower and an HLB of 15 or more is contained in a content of 40% by mass or more based on the total amount of the oil or the non-volatile ink with which the lead is impregnated, whereby obtained is a water-soluble calcined pencil lead which is dissolved readily and evenly on written surfaces by tracing the written surfaces with a brush soaked with water after writing.

The surfactant having a melting point of 55° C. or lower and an HLB of 15 or more which can be used includes, for example, at least one of polyoxyethylene alkyl ethers such as polyoxyethylene oleyl ether, polyoxyethylene stearyl ether, polyoxyethylene cetyl ether and polyoxyethylene behenyl ether, and polyethylene glycol fatty acid esters such as polyethylene glycol monostearate (PEG monostearate).

In the calcined pencil lead of the present invention, a mass ratio (A):(B) of at least one (A) selected from the dibasic acids having 12 to 30 carbon atoms and the derivatives thereof to the total amount (B) of the oil or the non-volatile ink with which the lead is impregnated falls in a range of preferably 3:100 to 30:100.

If the above mass ratio (A):(B) is less than 3:100, the effect of enhancing the coloring property is not exerted, and on the other hand, if it exceeds 16:100, the coloring property is not improved furthermore, and the writing performance is rather deteriorated in a certain case.

The calcined pencil lead obtained in the present invention is used in the forms of a wood case pencil lead prepared by loading the calcined pencil lead in a wood case, a calcined pencil lead for a mechanical pencil and a water-soluble calcined pencil lead which is dissolved readily and evenly on written surfaces by tracing the written surfaces with a brush soaked with water after writing.

The calcined pencil lead of the present invention thus constituted is a calcined pencil lead prepared by impregnating open pores with an oil or a non-volatile ink, wherein at least one selected from the dibasic acids having 12 to 30 carbon atoms and the derivatives thereof is contained in the oil or the non-volatile ink described above; the dibasic acid having 12 to 30 carbon atoms and the derivative thereof are preferably the dibasic acid and the derivative thereof represented by the formula (1) described above, and/or a long-chain dibasic acid diglycidyl ester having 12 to 30 carbon atoms; the dibasic acid having 12 to 30 carbon atoms and the derivative thereof having a melting point of 60° C. or lower are used; a content thereof is controlled to a range of 0.1 to 8% based on the total amount of the calcined pencil lead; and a mass ratio (A):(B) of at least one (A) selected from the dibasic acids having 12 to 30 carbon atoms and the derivatives thereof to the total amount (B) of the oil or the non-volatile ink with which the lead is impregnated is controlled to a range of 3:100 to 30:100, whereby obtained is the calcined pencil lead which can write remarkably darkly even on smooth and non-absorbing surfaces of art paper, coated paper, plastics, metal, glass, white boards and the like as well as paper of a notebook, a memo pad and the like having high smoothness.

Further, obtained is the water-soluble calcined pencil lead which is dissolved readily and evenly on written surfaces by tracing the written surfaces with a brush soaked with water after writing.

According to the calcined pencil lead of the present invention, provided is the calcined pencil lead which can write remarkably darkly even on smooth and non-absorbing surfaces of art paper, coated paper, plastics, metal, glass, white boards and the like as well as paper of a notebook, a memo pad and the like having high smoothness. Further, provided is the water-soluble calcined pencil lead which is dissolved readily and evenly on written surfaces by tracing the written surfaces with a brush soaked with water after writing.

The non-calcined pencil lead of the present invention thus constituted shall not be restricted to the embodiment described above and can be varied and embodied in various manners in a scope of the technical concept of the present invention.

EXAMPLES

Next, the present invention shall be explained more specifically with reference to examples and comparative examples, but the present invention shall by no means be restricted to the examples shown below.

Examples 1 to 5 and Comparative Examples 1 to 5:
Solid Drawing Material

Example 1

| | |
|---|---|
| Beef tallow hydrogenated oil (melting point: 51° C.) | 20% |
| Castor wax (melting point: 85° C.) | 30% |
| 8,13-Dimethyleicosanedioic acid (liquid at room temperature) | 2% |
| Terpene resin | 5% |
| Talc | 23% |
| Ultramarine blue | 10% |
| Phthalocyanine blue | 10% |

The blend composition described above was heated, mixed and dispersed by means of a kneader and then kneaded by means of a two roll mill. Then, the mixture was extrusion molded by means of a plunger type extruding machine to prepare a blue lead having a diameter of 4.4 mm, and paper was further wound plural times around the lead to obtain a blue solid drawing material having a diameter of 8.0 mm.

Example 2

| | |
|---|---|
| Japan wax (melting point: 52° C.) | 40% |
| 8-Ethyloctadecanedioic acid (paste-like at room temperature, hereinafter the same shall apply) | 3% |
| Rosin ester (softening point: 86° C.) | 15% |
| Talc | 17% |
| Titanium dioxide (average particle diameter: 100 nm or more and 1500 nm or less, hereinafter the same shall apply) | 15% |
| Disazo yellow AAA | 2% |
| Phthalocyanine green | 8% |

The blend composition described above was heated, mixed and dispersed by means of a kneader and then kneaded by means of a two roll mill. Then, the mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

Example 3

| | |
|---|---|
| Beef tallow hydrogenated oil (melting point: 51° C.) | 40% |
| 8-Ethyloctadecanedioic acid | 3% |
| Rosin ester (softening point: 86° C.) | 15% |
| Talc | 17% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

Example 4

| | |
|---|---|
| Beef tallow hydrogenated oil (melting point: 51° C.) | 40% |
| Dimethyl 8,12-eicosadienedioate (melting point: 30° C.) | 3% |
| Rosin ester (softening point: 86° C.) | 15% |
| Talc | 17% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was molded by means of an injection molding machine to prepare a green lead having a diameter of 6.8 mm, and a paper-made seal was further wound plural times around the lead to obtain a green solid drawing material having a diameter of 8.0 mm.

Example 5

| | |
|---|---|
| Japan wax (melting point: 52° C.) | 35% |
| Bis(oxylanylmethyl) 8,13-dimethyl-8,12-eicosadienedioate (liquid at room temperature) | 3% |
| Rosin ester (softening point: 86° C.) | 15% |
| Talc | 17% |
| Titanium dioxide | 10% |
| Ultramarine blue | 10% |
| Phthalocyanine blue | 10% |

The blend composition described above was heated, mixed and dispersed by means of a kneader and then kneaded by means of a two roll mill. Then, the mixture was molded by means of an injection molding machine to prepare a blue lead having a diameter of 6.8 mm, and a paper-made seal was further wound plural times around the lead to obtain a blue solid drawing material having a diameter of 8.0 mm.

Comparative Example 1

| | |
|---|---|
| Beef tallow hydrogenated oil (melting point: 51° C.) | 22% |
| Castor wax (melting point: 85° C.) | 30% |
| Terpene resin | 5% |
| Talc | 23% |
| Ultramarine blue | 10% |
| Phthalocyanine blue | 10% |

The blend composition described above was heated, mixed and dispersed by means of a kneader and then kneaded by means of a two roll mill. Then, the mixture was extrusion molded by means of a plunger type extruding machine to prepare a blue lead having a diameter of 4.4 mm, and paper was further wound plural times around the lead to obtain a blue solid drawing material having a diameter of 8.0 mm.

Comparative Example 2

| | |
|---|---|
| Japan wax (melting point: 52° C.) | 43% |
| Rosin ester (softening point: 86° C.) | 15% |
| Talc | 17% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

Comparative Example 3

| | |
|---|---|
| Beef tallow hydrogenated oil (melting point: 51° C.) | 43% |
| Rosin ester (softening point: 86° C.) | 15% |
| Talc | 17% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

Comparative Example 4

| | |
|---|---|
| Beef tallow hydrogenated oil (softening point: 51° C.) | 43% |
| Rosin ester (melting point: 86° C.) | 15% |
| Talc | 17% |

-continued

| | |
|---|---|
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was molded by means of an injection molding machine to prepare a green lead having a diameter of 6.8 mm, and a paper-made seal was further wound plural times around the lead to obtain a green solid drawing material having a diameter of 8.0 mm.

Comparative Example 5

| | |
|---|---|
| Japan wax (melting point: 52° C.) | 38% |
| Rosin ester (melting point: 86° C.) | 15% |
| Talc | 17% |

-continued

| | |
|---|---|
| Titanium oxide | 10% |
| Ultramarine blue | 10% |
| Phthalocyanine blue | 10% |

The blend composition described above was heated, mixed and dispersed by means of a kneader and then kneaded by means of a two roll mill. Then, the mixture was molded by means of an injection molding machine to prepare a blue lead having a diameter of 6.8 mm, and a paper-made seal was further wound plural times around the lead to obtain a blue solid drawing material having a diameter of 8.0 mm.

The solid drawing materials prepared in Examples 1 to 5 and Comparative Examples 1 to 5 described above were used to evaluate respectively strength, and a coloring property and erasability in drawing on copier paper, a milk pack, a PET film and a white board (WB) by the following evaluation methods. The results thereof are shown in the following Table 1.

(1) Evaluation Method of Strength:
The leads on which the paper, the seals or the like are not wound were used to measure a 3-point flexural strength at a temperature of 23° C. and an interval of 60 mm between fulcrums to determine a load with which the leads were broken. It was shown by a unit of megapascal (MPa).

(2) Evaluation Method of Coloring Property:
The leads were used to draw pictures on copier paper, a milk pack, a PET film and a white board (WB) to evaluate a coloring property according to five stages of A to E. In the evaluations of the five stages, A shows that the lines were drawn most darkly, and E shows that the lines were drawn most lightly or could not be drawn.

(3) Evaluation Method of Erasability:
The lines drawn on a PET film and a white board in evaluating the coloring property of (2) described above were rubbed with tissue paper to evaluate erasability according to five stages of A to E. In the evaluation of the five stages, A shows that the lines were erased in the best mode, and E shows that the lines were erased in the worst mode. In addition, for the leads with which the lines were not drawn or the leads with which the lines were drawn very lightly, the evaluation of the erasability was ranked to E in evaluation of (2) described above.

TABLE 1

(Respective evaluations of solid drawing materials)

| | Strength (MPa) | Coloring Property copier paper | Coloring Property milk P | Coloring Property PET | Coloring Property WB | Erasability PET | Erasability WB |
|---|---|---|---|---|---|---|---|
| Example 1 | 13 | A | B | B | C | A | B |
| Example 2 | 12 | A | A | A | A | A | B |
| Example 3 | 14 | A | B | B | B | A | B |
| Example 4 | 15 | A | B | B | B | A | B |
| Example 5 | 14 | A | A | A | A | A | B |
| Comparative Example 1 | 12 | A | C | D | E | E | E |
| Comparative Example 2 | 12 | A | B | B | C | D | C |
| Comparative Example 3 | 12 | A | C | C | E | E | E |
| Comparative Example 4 | 14 | B | D | D | E | E | E |
| Comparative Example 5 | 14 | A | C | C | D | E | D |

As shown in Table 1 described above, all the solid drawing materials prepared in Examples 1 to 5 falling in the scope of the present invention showed the good results (however, the erasability of the lines drawn on the white board was a little inferior to that of lines drawn thereon with a marker exclusive for a commercial white board, therefore it was judged to B), but the test results obtained in Comparative Examples 1 to 5 falling outside the scope of the present invention resulted in showing that some of the quality items were inferior.

The solid drawing materials prepared in Comparative Examples 1 to 5 had the compositions in which at least one selected from the dibasic acids having 12 to 30 carbon atoms and the derivatives thereof was not contained as compared with those prepared in Examples 1 to 5, wherein in Comparative Example 1, the lead could draw lines darkly on copier paper because it had an ordinary soft hardness, but slipped on the smooth surfaces of a milk pack, PET and a WB and could draw only light lines; in Comparative Examples 2 and 5, the drawing materials contained Japan wax having a high viscoductility in the large contents of 43% and 38% and therefore could draw lines as well on the smooth surfaces of a milk pack and PET (close to Examples 3 and 4), but they slipped on a WB and were hard to draw lines thereon and resulted in showing that they were much inferior to that prepared in corresponding Example 2; also, they were inferior to those prepared in Examples 2 and 5 to a large extent as well in terms of erasability; in Comparative Examples 3 and 4, the leads could draw lines darkly on a copier paper but slipped on the smooth surfaces of a milk pack, PET and a WB and could draw only light lines; also, they were inferior to those prepared in corresponding Examples 3 and 4 to a large extent, in spite of the light drawn lines, in terms of erasability.

Examples 6 to 8 and Comparative Examples 6 to 8: Water-Soluble Solid Drawing Material Example 6

| | |
|---|---|
| Japan wax (melting point: 52° C.) | 4% |
| Polyoxyethylene cetyl ether (HLB: 19.5) | 18% |
| Dimethyl 8,12-eicosadienedioate (melting point: 30° C.) | 3% |
| Carboxymethyl cellulose sodium salt | 5% |
| Talc | 50% |
| Permanent Red | 20% |

The same weight of water was added to the blend composition described above, and the mixture was heated, mixed and dispersed by means of a kneader and then kneaded by means of a two roll mill. The mixture was extrusion molded by means of a plunger type extruding machine to obtain a red non-calcined pencil lead for a wood case having a diameter of 3.8 mm.

Example 7

| | |
|---|---|
| Polyoxyethylene stearyl ether (HLB: 18.0) | 20% |
| Polyoxyethylene hydrogenated castor oil (HLB: 13.5) | 28% |
| 8,13-Dimethyleicosanedioic acid (liquid at room temperature) | 4% |
| Polyethylene oxide | 5% |
| Talc | 23% |
| Ultramarine blue | 10% |
| Phthalocyanine blue | 10% |

The blend composition described above was heated, mixed and dispersed by means of a kneader and then kneaded by means of a two roll mill. Then, the mixture was extrusion molded by means of a plunger type extruding machine to prepare a blue lead having a diameter of 4.4 mm, and paper was further wound plural times around the lead to obtain a blue solid drawing material having a diameter of 8.0 mm.

Example 8

| | |
|---|---|
| PEG monostearate (HLB: 18.0) | 40% |
| 8-Ethyloctadecanedioic acid (paste-like at room temperature) | 5% |
| Polyethylene oxide•polypropylene oxide copolymer | 15% |
| Kaolin | 15% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

Comparative Example 6

| | |
|---|---|
| Japan wax (melting point: 52° C.) | 5% |
| Polyoxyethylene cetyl ether (HLB: 19.5) | 20% |
| Carboxymethyl cellulose sodium salt | 5% |
| Talc | 50% |
| Permanent Red | 20% |

The same weight of water was added to the blend composition described above, and the mixture was heated, mixed and dispersed by means of a kneader and then kneaded by means of a two roll mill. Then, the above mixture was extrusion molded by means of a plunger type extruding machine to obtain a red non-calcined pencil lead for a wood case having a diameter of 3.8 mm.

Comparative Example 7

| | |
|---|---|
| Polyoxyethylene stearyl ether (HLB: 18.0) | 24% |
| Castor wax (melting point: 85° C.) | 28% |
| Polyethylene oxide | 5% |
| Talc | 23% |
| Ultramarine blue | 10% |
| Phthalocyanine blue | 10% |

The blend composition described above was heated, mixed and dispersed by means of a kneader and then kneaded by means of a two roll mill. Then, the above mixture was extrusion molded by means of a plunger type extruding machine to prepare a blue lead having a diameter of 4.4 mm, and paper was further wound plural times around the lead to obtain a blue solid drawing material having a diameter of 8.0 mm.

Comparative Example 8

| | |
|---|---|
| Sorbitan palmitate (HLB: 6.7) | 45% |
| Polyethylene oxide•polypropylene oxide copolymer | 15% |
| Kaolin | 15% |
| Titanium dioxide | 15% |
| Disazo yellow AAA | 2% |
| Phthalocyanine green | 8% |

The blend composition described above was heated, mixed and dispersed by means of a kneader and then kneaded by means of a two roll mill. Then, the above mixture was extrusion molded by means of a plunger type extruding machine to prepare a green lead having a diameter of 6.8 mm, and a paper-made seal was further wound plural times around the lead to obtain a green solid drawing material having a diameter of 8.0 mm.

The water-soluble solid drawing materials prepared in Examples 6 to 8 and Comparative Examples 6 to 8 described above were used to evaluate respectively strength, and a coloring property and solubility in drawing on art paper, a milk pack, and a PET film by the following evaluation methods. The results thereof are shown in the following Table 2. It was shown by a unit of megapascal (MPa).

(1) Evaluation Method of Strength:

The leads on which the paper, the seals or the like are not wound were used to measure a 3-point flexural strength at a temperature of 23° C. and an interval of 60 mm between fulcrums to determine a load with which the leads were broken. It was shown by a unit of megapascal (MPa).

(2) Evaluation Method of Coloring Property:

The leads were used to draw pictures on art paper, a milk pack, and a PET film to evaluate a coloring property according to five stages of A to E. In the evaluations of the five stages, A shows that the lines were drawn most darkly, and E shows that the lines were drawn most lightly or could not be drawn.

(3) Evaluation Method of Solubility:

The lines drawn on art paper and a milk pack in evaluation of the coloring property of (2) described above were traced with a brush soaked with water to evaluate solubility according to five stages of A to E. A shows that the lines were dissolved in the best mode, and E shows that the lines were dissolved in the worst mode.

TABLE 2

(Respective evaluations of water-soluble solid drawing materials)

| | Strength (MPa) | Coloring property art paper | Coloring property milk P | Coloring Property PET | Solubility art paper | Solubility milk P |
|---|---|---|---|---|---|---|
| Example 6 | 30 | A | B | B | B | B |
| Example 7 | 11 | A | A | A | A | A |
| Example 8 | 11 | A | A | A | A | A |
| Comparative Example 6 | 28 | D | D | E | E | E |
| Comparative Example 7 | 10 | C | C | D | D | E |
| Comparative Example 8 | 11 | C | C | D | D | D |

As shown in Table 2 described above, all the water-soluble solid drawing materials prepared in Examples 6 to 8 of the present invention showed the good results.

In contrast with this, the solid drawing materials prepared in Comparative Examples 6 to 8 slipped on the smooth surfaces of art paper, a milk pack, a PET film and the like and could not draw lines darkly thereon. Also, in the evaluation of the solubility, the drawn lines were light, and intensity thereof after dissolved was pale as well, so that they were ranked to the low evaluations of D and E.

Examples 9 to 12 and Comparative Examples 9 to 12: Non-Calcined Color Pencil Lead Example 9

| Blend composition A: | |
|---|---|
| Low density polyethylene | 5% |
| Paraffin wax 150F | 13% |
| Talc | 40% |
| Titanium dioxide | 14% |
| Phthalocyanine blue | 6% |
| Blend composition B: | |
| Ethyl cellulose | 10% |
| Castor wax (melting point: 85° C.) | 10% |
| Dimethyl eicosanedioate (melting point: 60° C.) | 2% |

The blend composition A described above was heated, mixed and dispersed by means of a kneader and then kneaded by means of a two roll mill. Then, the mixture was cooled down to room temperature and crushed. Also, the blend composition B described above was heated and mixed by means of a heating mixer, and then it was cooled down to room temperature and crushed. Next, the blend compositions A and B each crushed were kneaded by means of a two roll mill and pelletized, and then it was molded by means of a single screw type extrusion molding machine to obtain a blue non-calcined pencil lead for a wood case having a diameter of 3.0 mm.

Example 10

| Japan wax (melting point: 52° C.) | 18% |
|---|---|
| 8,13-dimethyleicosanedioic acid (liquid at room temperature) | 2% |
| Rosin | 8% |
| Carboxymethyl cellulose sodium salt | 5% |
| Talc | 49% |
| Carbon black | 18% |

The same mass of water was added to the blend composition described above, and the mixture was heated, mixed and dispersed by means of a kneader and then kneaded by means of a two roll mill. The above mixture was extrusion molded by means of a plunger type extruding machine to obtain a black non-calcined pencil lead for a wood case having a diameter of 4.0 mm.

Example 11

| Castor wax (melting point: 85° C.) | 20% |
|---|---|
| Eicosanedioic acid (melting point: 120° C.) | 3% |
| Celluloid | 20% |

-continued

| | |
|---|---|
| Talc | 25% |
| Titanium dioxide | 2% |
| Lake Red C | 30% |

Methyl ethyl ketone (MEK) of the same weight as that of the blend composition excluded castor wax and eicosanedioic acid out of the blend composition described above was added, and they were mixed and dispersed by means of a mixer. Next, a mixture prepared by melting and mixing castor wax and eicosanedioic acid was added to the mixer described above and mixed, and then the mixture was kneaded by means of a two roll mill. The above mixture was extrusion molded by means of a plunger type extruding machine, and MEK was removed by heating to obtain a red non-calcined pencil lead for a mechanical pencil having a diameter of 2.0 mm.

Example 12

| | |
|---|---|
| Castor wax (melting point: 85° C.) | 20% |
| Dimethyl 8,12-eicosadienedioate (melting point: 30° C.) | 2% |
| Diallyl orthophthalate prepolymer | 18% |
| Diallyl orthophthalate monomer | 2% |
| t-Butyl peroxybenzoate | 0.5% |
| Talc | 42.5% |
| Titanium dioxide | 10% |
| Phthalocyanine green | 5% |

The blend composition described above was heated, mixed and dispersed by means of a kneader and then kneaded and pelletized by means of a two roll mill. Then, it was extrusion molded by means of a single screw type extrusion molding machine, and then the molded product was cured by heating at 120° C. to obtain a green non-calcined pencil lead for a wood shaft having a diameter of 3 mm.

Comparative Example 9

| | |
|---|---|
| Blend composition A: | |
| Low density polyethylene | 5% |
| Paraffin wax 150 F. | 15% |
| Talc | 40% |
| Titanium dioxide | 14% |
| Phthalocyanine blue | 6% |
| Blend composition B: | |
| Ethyl cellulose | 10% |
| Castor wax (melting point: 85° C.) | 10% |

The blend composition A described above was heated, mixed and dispersed by means of a kneader and then kneaded by means of a two roll mill. Then, the mixture was cooled down to room temperature and crushed. Also, the blend composition B described above was heated and mixed by means of a heating mixer, and then it was cooled down to room temperature and crushed. Next, the blend compositions A and B each crushed were kneaded by means of a two roll mill and pelletized, and then it was molded by means of a single screw type extrusion molding machine to obtain a blue non-calcined pencil lead for a wood case having a diameter of 3.0 mm.

Comparative Example 10

| | |
|---|---|
| Japan wax (melting point: 52° C.) | 20% |
| Rosin | 8% |
| Carboxymethyl cellulose sodium salt | 5% |
| Talc | 49% |
| Carbon black | 18% |

The same mass of water was added to the blend composition described above, and they were heated, mixed and dispersed by means of a kneader and then kneaded by means of a two roll mill. The above mixture was extrusion molded by means of a plunger type extruding machine to obtain a black non-calcined pencil lead for a wood case having a diameter of 4.0 mm.

Comparative Example 11

| | |
|---|---|
| Castor wax (melting point: 85° C.) | 23% |
| Celluloid | 20% |
| Talc | 25% |
| Titanium dioxide | 2% |
| Lake Red C | 30% |

Methyl ethyl ketone (MEK) of the same weight as that of the blend composition excluded castor wax out of the blend composition described above was added, and they were mixed and dispersed by means of a mixer. Next, molten castor wax was added to the mixer described above and mixed, and then the mixture was kneaded by means of a two roll mill. The above mixture was extrusion molded by means of a plunger type extruding machine, and MEK was removed by heating to obtain a red non-calcined pencil lead for a mechanical pencil having a diameter of 2.0 mm.

Comparative Example 12

| | |
|---|---|
| Castor wax (melting point: 85° C.) | 22% |
| Diallyl orthophthalate prepolymer | 18% |
| Diallyl orthophthalate monomer | 2% |
| t-Butyl peroxybenzoate | 0.5% |
| Talc | 42.5% |
| Titanium dioxide | 10% |
| Phthalocyanine green | 5% |

The blend composition described above was heated, mixed and dispersed by means of a kneader and then kneaded and pelletized by means of a two roll mill. It was extrusion molded by means of a single screw type extrusion molding machine, and then the molded product was cured by heating at 120° C. to obtain a green non-calcined color pencil lead for a wood case having a diameter of 3 mm.

The non-calcined pencil leads prepared in Examples 9 to 12 and Comparative Examples 9 to 12 described above were used to evaluate strength and a coloring property in drawing on copier paper, a canvas for oil paintings, a milk pack and a PET film by the following evaluation methods. The results thereof are shown in the following Table 3.

(1) Evaluation Method of Strength:

The leads were used to measure a 3-point flexural strength at a temperature of 23° C. and an interval of 60 mm between fulcrums to determine a load with which the leads were broken. It was shown by a unit of megapascal (MPa).

(2) Evaluation Method of Coloring Property:

The leads were used to draw pictures on copier paper, a canvas for oil paintings, a milk pack and a PET film to evaluate a coloring property according to five stages of A to E. In the evaluation of the five stages, A shows that the lines were drawn most darkly, and E shows that the lines were drawn most lightly or could not be drawn.

TABLE 3

(Respective evaluations of non-calcined color pencil leads)

|  | Strength (MPa) | Coloring Property copier paper | Coloring Property Canvas | Coloring Property milk P | Coloring Property PET |
|---|---|---|---|---|---|
| Example 9 | 40 | A | B | B | C |
| Example 10 | 19 | A | A | A | A |
| Example 11 | 52 | B | C | C | D |
| Example 12 | 46 | A | B | B | C |
| Comparative Example 9 | 39 | A | D | D | E |
| Comparative Example 10 | 19 | A | B | B | C |
| Comparative Example 11 | 53 | B | E | E | E |
| Comparative Example 12 | 47 | B | D | E | E |

As shown in Table 3 described above, all the non-calcined color pencil leads prepared in Examples 9 to 12 falling in the scope of the present invention showed the good results, but the test results obtained in Comparative Examples 9 to 12 falling outside the scope of the present invention resulted in showing that some of the quality items were inferior.

In Examples 9 to 12, it has been found that the middle hard non-calcined color pencil leads prepared in Examples 9 and 12 and the hard non-calcined color pencil lead prepared in Example 11 are hard and therefore inferior to the pencil lead prepared in Example 10 in a coloring property on a milk pack and PET but superior to the conventional pencil leads prepared in corresponding Comparative Examples 9 and 12.

In Comparative Examples 9 to 12, the non-calcined color pencil leads prepared in Comparative Examples 9 and 12 had an ordinary middle hardness and therefore could draw ordinarily on copier paper but slipped on the smooth surfaces of a canvas for oil paintings, a milk pack and a PET film and could draw only light lines. The non-calcined color pencil lead prepared in Comparative Example 10 contained Japan wax having a high viscoductility in a content of 20% and therefore could draw pictures as well on the smooth surfaces to some extent but resulted in showing that it was inferior to that prepared in corresponding Example 10 to a large extent. The non-calcined color pencil lead prepared in Comparative Example 11 was a hard lead as described above, and therefore it was hard and could scarcely draw on the smooth surfaces.

Examples 13 to 16 and Comparative Examples 13 to 15: Calcined Pencil Lead

Example 13

| Blend composition for lead body: | |
|---|---|
| Natural crystalline graphite | 44% |
| Vinyl chloride resin | 40% |
| Dioctyl phthalate (DOP) | 15% |
| Oleic acid amide | 1% |

The blend composition for a lead body described above was heated, mixed and dispersed by means of a kneader and then kneaded by means of a two roll mill. It was then pelletized and extrusion molded, and DOP was removed by heating in the air, followed by heating it at 1000° C. in a nitrogen atmosphere.

| Blend composition for impregnation liquid: | |
|---|---|
| Polyoxyethylene lauryl ether (HLB: 9.5) | 85% |
| 8,13-dimethyleicosanedioic acid (liquid at room temperature) | 15% |

The lead body described above was heated at 1000° C. and then cooled down to room temperature, and it was dipped in the impregnation liquid described above at 120° C. and left standing for 24 hours. Then, it was taken out, and the surplus liquid was removed to obtain a calcined pencil lead for a mechanical pencil having a diameter of 0.56 mm.

The lead body was impregnated with the impregnation liquid in a content of 12.1% in the whole, and therefore a content of at least one selected from the dibasic acid having 12 to 30 carbon atoms and the derivative thereof in Example 13 was about 1.8%.

A rate of the impregnation liquid in the calcined pencil lead obtained was calculated by the following equation, and further a content of at least one selected from the dibasic acids having 12 to 30 carbon atoms and the derivatives thereof was calculated from the blend composition of the impregnation liquid (the same shall apply in the following examples).

A content calculation equation of at least one selected from the dibasic acids having 12 to 30 carbon atoms and the derivatives thereof:

Content (%)=[{(lead weight after impregnation)−(lead weight before impregnation)}÷(lead weight after impregnation)×(rate of dibasic acid and derivative thereof of the present invention in impregnation liquid)÷(whole impregnation liquid)]×100

Example 14

The lead body prepared in the same composition by the same production method as in Example 13 described above was heated at 1000° C. and then cooled down to room temperature, and it was dipped in an impregnation liquid having the following blend composition at 120° C. and left standing for 24 hours. Then, it was taken out, and the surplus liquid was removed to obtain a calcined pencil lead for a mechanical pencil having a diameter of 0.56 mm.

| Blend composition for impregnation liquid: | |
|---|---|
| α-Olefin oligomer | 80% |
| Bis(oxylanylmethyl) 8,13-dimethyl-8,12-eicosadienedioate (liquid at room temperature) | 20% |

The lead body was impregnated with the impregnation liquid in a content of 11.5% in the whole, and therefore a content of at least one selected from the dibasic acids having 12 to 30 carbon atoms and the derivatives thereof in Example 14 was about 2.3%.

Example 15

| Blend composition for lead body: | |
| --- | --- |
| Hexagonal boron nitride | 40% |
| Vinyl chloride resin | 44% |
| Dioctyl phthalate (DOP) | 15% |
| Oleic acid amide | 1% |

The blend composition for lead body described above was heated, mixed and dispersed by means of a kneader and then kneaded by means of a two roll mill. It was then pelletized and extrusion molded, and DOP was removed by heating in the air, followed by heating it in order at 1000° C. in a nitrogen atmosphere and 700° C. in the air. After cooled down to room temperature, it was impregnated with a perhydropolysilazane solution and heated again at 1250° C. in a nitrogen atmosphere.

| Blend composition for impregnation liquid: | |
| --- | --- |
| Oleyl alcohol | 51% |
| 8-Ethyloctadecanedioic acid (paste-like at room temperature) | 9% |
| Ethyl alcohol | 25% |
| Basic red dye | 15% |

The lead body described above heated at 1250° C. and then cooled down to room temperature was dipped in the impregnation liquid described above at 100° C. and left standing for 24 hours. Then, it was taken out, and ethyl alcohol was removed by heating to obtain a red calcined pencil lead for a mechanical pencil having a diameter of 0.56 mm.

The lead body was impregnated with the impregnation liquid in a content of 20.5% in the whole, and therefore a content of at least one selected from the dibasic acids having 12 to 30 carbon atoms and the derivatives thereof in Example 15 was about 1.8%.

Example 16

| Blend composition for lead body: | |
| --- | --- |
| Natural crystalline graphite | 68% |
| Natural halloysite | 29% |
| Gum arabic | 3% |

The same weight of water was added to the blend composition for lead body described above, and they were heated, mixed and dispersed by means of a mixer. Then, the water content was adjusted by a two roll mill. Then, the mixture was extrusion molded by means of a plunger type extruding machine, and the water was removed by heating in the air, followed by heating it at 1100° C. in a non-oxidative atmosphere.

| Blend composition for impregnation liquid: | |
| --- | --- |
| Polyoxyethylene lauryl ether (HLB: 9.5) | 35% |
| Polyoxyethylene lauryl ether (HLB: 19.5) | 50% |
| Dimethyl 8,12-eicosadienedioate | 15% |

The lead body described above heated at 1100° C. and then cooled down to room temperature was dipped in the impregnation liquid described above at 120° C. and left standing for 24 hours. Then, it was taken out, and the surplus liquid was removed to obtain a calcined pencil lead for a wood case having a diameter of 2.0 mm.

The lead body was impregnated with the impregnation liquid in a content of 10.2% in the whole, and therefore a content of at least one selected from the dibasic acids having 12 to 30 carbon atoms and the derivatives thereof in Example 16 was about 1.5%.

Comparative Example 13

The lead body prepared in the same composition by the same production method as in Example 13 described above was heated at 1000° C. and then cooled down to room temperature, and it was dipped in polyoxyethylene lauryl ether (HLB: 9.5) at 120° C. and left standing for 24 hours. Then, it was taken out, and the surplus liquid was removed to obtain a calcined pencil lead for a mechanical pencil having a diameter of 0.56 mm.

Comparative Example 14

| Blend composition for impregnation liquid: | |
| --- | --- |
| Oleyl alcohol | 60% |
| Ethyl alcohol | 25% |
| Basic red dye | 15% |

The lead prepared in the same composition by the same production method as in Example 15 described above was heated at 1250° C. and then cooled down to room temperature, and it was dipped in the impregnation liquid described above at 100° C. and left standing for 24 hours. Then, it was taken out, and ethyl alcohol was removed by heating to obtain a red calcined pencil lead for a mechanical pencil having a diameter of 0.56 mm.

Comparative Example 15

| Blend composition for impregnation liquid: | |
| --- | --- |
| Polyoxyethylene lauryl ether (HLB: 9.5) | 50% |
| Polyoxyethylene lauryl ether (HLB: 19.5) | 50% |

The lead body prepared in the same composition by the same production method as in Example 16 described above was heated at 1100° C. and then cooled down to room temperature, and it was dipped in the impregnation liquid described above at 120° C. and left standing for 24 hours. Then, it was taken out, and the surplus liquid was removed to obtain a calcined pencil lead for a wood case having a diameter of 2.0 mm.

The calcined pencil leads prepared in Examples 13 to 16 and Comparative Examples 13 to 15 described above were used to evaluate and confirm a coloring property in drawing on copier paper, art paper and a PET film, and erasability of lines drawn on copier paper and solubility. The results thereof are shown in the following Table 4.

(1) Evaluation Method of Coloring Property:

The leads were used to draw lines on copier paper, art paper and a PET film to evaluate a coloring property according to five stages of A to E. In the evaluation of the five stages, A shows that the lines were drawn most darkly, and E shows that the lines were drawn most lightly or could not be drawn.

(2) Evaluation Method of Erasability with Eraser:

Lines were written in a length of 6 m on copier paper by means of a record type writing equipment, and a written part thereof was rubbed three times with an eraser EP-105 manufactured by Mitsubishi Pencil Company, Limited. which was cut in Φ7 while applying a load of 10N in a vertical direction to the eraser to measure a brightness L* thereof before and after erased and calculate erasability according to the following equation:

erasability (%)=($L^*$after eased−$L^*$before eased)÷($L^*$after eased)×100

(3) Evaluation Method of Solubility:

The lines drawn on copier paper and art paper in evaluation of the coloring property of (1) described above for Example 16 and Comparative Example 15 were traced with a brush soaked with water to evaluate solubility according to five stages of A to E. A shows that the lines were dissolved in the best mode, and E shows that the lines were dissolved in the worst mode.

TABLE 4

(Respective evaluations of calcined pencil leads)

| | Coloring property copier paper | Coloring property art paper | Coloring property PET | Erasability erasing rate (%) | Solubility copier paper | Solubility art paper |
|---|---|---|---|---|---|---|
| Example 13 | A | A | A | 96 | — | — |
| Example 14 | A | A | B | 95 | — | — |
| Example 15 | A | A | A | 94 | — | — |
| Example 16 | A | A | A | 92 | A | A |
| Comparative Example 13 | A | D | E | 94 | — | — |
| Comparative Example 14 | A | D | E | 94 | — | — |
| Comparative Example 15 | A | C | E | 89 | B | E |

As shown in Table 4, all the calcined pencil leads prepared in Examples 13 to 16 falling in the scope of the present invention showed the good results. That is, they can write well even on smooth surfaces, and even when written on ordinary paper such as copier paper, they had erasability equivalent to those of the calcined pencil leads prepared in Comparative Examples 13 to 15 which were conventional leads falling outside the scope of the present invention.

In contrast with this, the test results obtained in Comparative Examples 13 to 15 falling outside the scope of the present invention resulted in showing that some of the quality items were inferior. In Comparative Examples 13 to 15, the dibasic acids were not contained, and therefore the pencil leads could write well on the surface of the copier paper but slipped on the smooth surfaces and could not write darkly.

Also, in Comparative Example 15, the solubility in water was evaluated, and the lines drawn on the writable copier paper could be dissolved, but the lines drawn on art paper were written very lightly to make it impossible to confirm solubility, so that it was evaluated in E rank.

INDUSTRIAL APPLICABILITY

Provided is a solid drawing material which can draw smoothly, darkly and finely pictures not only on smooth and non-absorbing surfaces of art paper, coated paper, milk packs, plastics such as PET, metal, glass, white boards, and the like, but also on eyebrows, lips, skins and the like as well as ordinary papers such as wood free paper, drawing paper and copier paper and which can readily be erased by cloths, papers such as tissue paper, white board erasers, and the like when drawn on the non-absorbing surfaces described above.

The invention claimed is:

1. A solid drawing material containing at least a resin, waxes, a pigment and an extender, wherein the resin is at least one selected from rosin and modified products thereof, terpene resins and modified products thereof, petroleum resins, maleic acid resins and derivatives thereof, coumarone.indene resins and derivatives thereof, and isoprene base resins, and wherein the solid drawing material further contains at least one selected from dibasic acids having 12 to 30 carbon atoms and a derivatives thereof represented by the following formula (1):

$R_2OOC-R_1-COOR_3$     (1)

wherein $R_1$ is a linear or branched alkylene group or alkenylene group having 12 to 28 carbon atoms, and $R_2$ and $R_3$ may be same or different and are a hydrogen atom, an alkyl group having 1 to 8 carbon atoms, an alkali metal, an amine salt, an epoxy group, a phenyl group and a glyceryl group.

2. The solid drawing material as described in claim 1, wherein the dibasic acid having 12 to 30 carbon atoms and the derivative thereof are a long-chain dibasic acid diglycidyl ester having 12 to 30 carbon atoms.

3. The solid drawing material as described in claim 1, wherein the dibasic acid having 12 to 30 carbon atoms and the derivative thereof have a melting point of 70° C. or lower.

4. The solid drawing material as described in claim 1, wherein a content of the dibasic acid having 12 to 30 carbon atoms and the derivative thereof falls in a range of 1 to 12% by mass based on the total amount of the solid drawing material.

5. The solid drawing material as described in claim 1, wherein a mass ratio (A):(B) of at least one (A) selected from the dibasic acids having 12 to 30 carbon atoms and the derivatives thereof to the whole waxes (B) contained in the solid drawing material falls in a range of 2:100 to 20:100.

6. The solid drawing material as described in claim 1 wherein a content of titanium dioxide as the pigment falls in a range of 5% by mass or more based on the total amount of the solid drawing material.

* * * * *